(12) United States Patent
Graf

(10) Patent No.: US 11,435,738 B2
(45) Date of Patent: Sep. 6, 2022

(54) OBSTACLE CLIMBING SURVEILLANCE ROBOT AND ENERGY-ABSORBING FRAME THEREFOR

(71) Applicant: Gary Graf, East Setauket, NY (US)

(72) Inventor: Gary Graf, East Setauket, NY (US)

( * ) Notice: Subject to any disclaimer, the term of this patent is extended or adjusted under 35 U.S.C. 154(b) by 288 days.

(21) Appl. No.: 16/610,513

(22) PCT Filed: May 7, 2018

(86) PCT No.: PCT/US2018/031297
§ 371 (c)(1),
(2) Date: Nov. 3, 2019

(87) PCT Pub. No.: WO2018/208636
PCT Pub. Date: Nov. 15, 2018

(65) Prior Publication Data
US 2021/0157313 A1    May 27, 2021

Related U.S. Application Data

(60) Provisional application No. 62/605,166, filed on Aug. 3, 2017, provisional application No. 62/602,959, filed on May 12, 2017.

(51) Int. Cl.
*B60L 50/60*      (2019.01)
*G05D 1/00*      (2006.01)
(Continued)

(52) U.S. Cl.
CPC ......... *G05D 1/0022* (2013.01); *B60K 7/0007* (2013.01); *B60L 50/60* (2019.02); *B60L 58/16* (2019.02); *B62D 29/046* (2013.01); *B62D 49/08* (2013.01); *B62D 53/00* (2013.01); *B62D 57/024* (2013.01); *G05D 1/021* (2013.01); *H04N 5/247* (2013.01); *H04N 7/18* (2013.01);
(Continued)

(58) Field of Classification Search
CPC .................. B60L 50/60; B60K 7/0007; B60K 2007/0092; B62D 29/046; B62D 49/08; B62D 53/00; B62D 57/024; G05D 2201/0207; G05D 2201/0209
See application file for complete search history.

(56) References Cited

U.S. PATENT DOCUMENTS

| | | | |
|---|---|---|---|
| 5,515,934 A * | 5/1996 | Davis | B25J 5/007 180/15 |
| 6,484,083 B1 * | 11/2002 | Hayward | B60D 1/00 180/24.05 |
| 8,434,576 B1 * | 5/2013 | Ferguson | B62D 55/075 180/14.2 |
| 2001/0047895 A1 * | 12/2001 | De Fazio | B62D 61/10 180/22 |

(Continued)

*Primary Examiner* — Frank B Vanaman
(74) *Attorney, Agent, or Firm* — John F. Vodopia

(57) ABSTRACT

A surveillance system includes a robot and an operator control unit (OCU) for controlling the robot. The robot includes a light-weight frame housing, wheels, motor compartments positioned within the light-weight frame housing, wheel motors positioned within the motor compartments and attached to the wheels, a camera for capturing surveillance images and an electronic controller that is electrically or wirelessly connected to the wheel motors and the camera and that is wirelessly connected to the OCU. The light-weight frame is made of light-weight foam that substantially surrounds, structurally supports and protects the robot wheel motors, camera and electronic controller from mechanical shock during intended use.

17 Claims, 29 Drawing Sheets

(51) Int. Cl.
*B60L 58/16* (2019.01)
*B60K 7/00* (2006.01)
*B62D 29/04* (2006.01)
*B62D 49/08* (2006.01)
*B62D 53/00* (2006.01)
*B62D 57/024* (2006.01)
*G05D 1/02* (2020.01)
*H04N 5/247* (2006.01)
*H04N 7/18* (2006.01)
*B62D 61/10* (2006.01)

(52) U.S. Cl.
CPC ... *B60K 2007/0092* (2013.01); *B60L 2200/40* (2013.01); *B62D 61/10* (2013.01); *G05D 2201/0207* (2013.01)

(56) References Cited

U.S. PATENT DOCUMENTS

| | | | | |
|---|---|---|---|---|
| 2006/0144624 | A1* | 7/2006 | Clark | A63H 17/26 180/65.1 |
| 2008/0027590 | A1* | 1/2008 | Phillips | G05D 1/0088 701/2 |
| 2008/0179115 | A1* | 7/2008 | Ohm | B62D 55/075 180/9.21 |
| 2010/0179691 | A1* | 7/2010 | Gal | F41H 7/005 700/259 |
| 2011/0168460 | A1* | 7/2011 | Goldenberg | B25J 5/005 180/9.3 |
| 2011/0240382 | A1* | 10/2011 | Gettings | B62D 55/0885 180/9.1 |
| 2014/0246257 | A1* | 9/2014 | Jacobsen | B62D 55/0655 180/14.2 |

* cited by examiner

OBSTACLE CLIMBING SURVEILLANCE ROBOT AND ENERGY-ABSORBING FRAME THEREFOR

CROSS-REFERENCE TO RELATED APPLICATIONS

The invention as described and claimed hereinbelow is a National Stage Application of PCT/US2018/031297, filed on May 7, 2018 ("the PCT application") now filed in the United States under 35 USC § 371. The PCT application claims priority under 35 USC § 119(e) from U.S. Provisional Patent Application No. 62/602,959, filed on May 12, 2017, and from U.S. Provisional Patent Application No. 62/605,166, filed Aug. 3, 2017. The content of each of the PCT application and the provisional patent applications is incorporated herein by reference.

BACKGROUND OF THE INVENTION

The invention relates broadly to a remotely-controlled robot, configured for surveillance and/or reconnaissance and constructed with a light-weight energy-absorbing frame. The invention relates more particularly to a remotely-controlled, obstacle climbing, wheeled surveillance and/or reconnaissance robot comprising a structural frame formed with foam and/or other light-weight, energy-absorbing materials (energy-absorbing frame), a drive system for robot movement, a plurality of wheels and/or obstacle (e.g., stair) climbing star wheels, a sensor system such as an imaging system for capturing and displaying images for surveillance, reconnaissance and/or robot movement, an electronic system including a controller and input device for controlling robot movement, surveillance and reconnaissance operations and an operator control system (OCU), constructed similarly to the electronic system for wirelessly controlling and receiving surveillance and/or reconnaissance data from the robot. The energy absorbing frame of both the robot and the OCU provides for the support and positioning of the drive system components, the sensor and/or imaging system components such as an image capture device (e.g., camera), display device in the OCU, and respective electronic system components, including a battery power supply, without limitation.

Remotely-controlled obstacle climbing surveillance robots are known. For example, the Robotex Avatar robot, is a tracked remote-controlled robot designed for surveillance, touting an ability to climb stairs. Like most tracked stair climbing robots, the Avatar uses operator controlled "flippers" to allow the robot to successfully mount and climb stairs. These tracked stair climbing robots are heavy (25 plus pounds), complex and require the operator to be trained to position the flipper in such a way as to best mount the stairs. Because these tracked robots tend to be heavy, they often have difficulty climbing stairs that are steep, (30-degree angle and greater) and smooth, (wood and tile). These common types of stairs are difficult for heavy robots to climb because a heavy robot cannot get enough grip on the smooth surface of the step to propel itself up the stair case. The tracked robots weight, combined with the smooth step surface and high angle causes the robot's tracks to slip off the step as it attempts to climb the stair case.

Wheeled robots encounter the same problem with traction and have the added disadvantage of the traction-less gap between the wheels. These gaps cause the wheels that cannot make contact to simply spin and offer no assistance while attempting to climb a staircase. Additionally, the reduced traction on the staircase causes the wheeled robot to bounce as the rubber tires gain and lose traction on the steps. Wheeled robots usually must resort to complex mechanical extensions to climb stairs making them heavy and difficult to use.

Stair climbing robots also have the potential of flipping back over as they climb steep staircases. The bigger and more complex the robot, the greater the potential because they are heavy and have a higher vertical center of gravity in relation to the ground. This higher center of gravity makes these robots flip backwards as they move up a staircase.

U.S. Pat. No. 8,434,576 discloses a known reconnaissance/surveillance robot that includes several interconnected articulating sections. Each of the interconnected articulating sections includes a tractor-like traction assembly that comprises a traction belt or track, gears or wheels and a motor for driving the traction assemblies. A first one of the traction assemblies is formed with a leading contact surface inclined at a forward angle with respect to the ground. Connectors connect the articulating sections (FIG. 2) to pivot about a central connection plate, to allow for articulation between the articulating sections. The articulation of the articulating sections is controlled or moderated by shock absorbers, to control the angle of articulation between the articulating sections, to apply pressure to a traction control assembly to ensure proper rotation, friction and/or pressure points. Each shock absorber has a damping device and a bias element embodying a spring.

As the robot is propelled forward, and is confronted by a step with an overhang (sometimes referred to as a "bullnose" stair), the articulating sections may pivot about the connector, with shock moderated by the damping devices of the shock absorber, whereinafter the bias element thereafter attempts to compel the articulating sections against the surface upon which each is in contact, or should contact to climb the obstacle/stair, whether up or down into a sunken grade. The robot however, has an inverted t-shape frame. The shock absorbers limited from going down expediently. The spring allows it spring back.

The robot disclosed in U.S. Pat. No. 8,434,576, however, is not without significant drawbacks. For example, the robot is quite heavy where if dropped or if it tumbles down stairs its mass can act with gravity as a destructive force. Moreover, the robot appears to be directed to stair climbing and locomotion over flat or substantially flat terrain otherwise, and perhaps more importantly, the length of leading contact surface in the first articulating section must be longer than the rise of a step. And of course, the robot is complex, with multiple propulsion device shock absorbers to absorb shock and "maintain tractive effort" with the bias mechanisms. But even more problematic is the robot's inability to operate if overturned—it does not have means to right itself and it cannot operate upside down, which is a huge shortcoming in a fall.

SUMMARY OF THE INVENTION

The remotely-controlled surveillance (or reconnaissance) robot of this invention overcomes the shortcomings of the prior art.

In an embodiment, the remotely-controlled surveillance (or reconnaissance) robot of this invention is constructed with a light-weight energy-absorbing frame (constructed with foam, for example), a low center of gravity, individually driven wheels and/or flexible obstacle climbing gears or tires and a set of cameras oriented 180 degrees to each other that together enable the inventive robot to be tossed without damage and to operate on either side on which it lands.

Preferably, the remotely-controlled obstacle climbing surveillance robot comprises a structural frame formed with foam and/or other light-weight, energy-absorbing materials (energy-absorbing frame), realizing a robot that is light-weight, for example, 12 pounds or less, and which readily absorbs shock. There is no need for conventional shock absorbers. Due to the use of modern foam and composite materials to form the frame, the inventive robot may be manufactured less expensively and more easily (simply), is lighter and better able to withstand shocks than known remote-controlled surveillance and reconnaissance robots.

The foam (for example, dashboard-type integral skin foam or cross-linked flame-retardant polyethylene foam) is used as the body or frame of the robot, whereby all the components such as the motors, sensors, electronics and batteries are placed in compartments that are mounted (e.g., glued) into cavities within the foam body, or fixed directly in the foam body. These component compartments are positioned throughout the foam body in such a way that none of the component compartments can make direct contact with another component compartment, even during expected movement and vibration of the compartments in response to mechanical shock.

The inventive robot's foam structure or frame substantially absorbs any shock or vibration caused by contact with the outside environment, therefore protecting the robot's components. This is particularly important when the robot is thrown or dropped, whereby the electric motors used for propulsion, or the electronic components such as the cameras, controllers, batteries, connectors, etc., could otherwise be damaged. Since each component is separated by foam, any blunt mechanical energy imposed upon the robot, and therefore, on the components, therein, at some point of impact, is absorbed within and therefore limited by the foam to protect the motors, etc.

In an embodiment, the compartments are made from light-weight composite materials and designed so that the components they house and protect can be easily removed for repair or replacement. The foam body can be made stronger and more rigid using carbon fiber rods and other composite materials strategically positioned throughout the structure to prevent unwanted flexing. And the carbon fiber rods are light and do not add much weight to the overall weight of the robot. The foam used for the frame or robot body also can be used to create modules and/or control units.

The operator control unit (OCU) controls the robot according to inventive principles. In an embodiment, the OCU comprises a radio control unit comprising a radio control, a radio receiver, an antenna, a display device, a microphone, a speaker, a voltmeter, switches, a robot control input device and a battery. The OCU is used to remotely control the robot and receive sensor data from any number of sensors provided on the robot, and image data comprising a live audio/video stream sent from the robots' cameras and microphone. The OCU microphone can send voice data to the robot speaker. Like the robots, the OCU is constructed with a housing frame formed of light-weight, vibration absorbent materials such as but not limited to polyethylene, polyurethane, sorbothene, carbon fiber, PVC, and various 3d printed materials. The housing frame thus formed may be covered with material such as but not limited to nylon, canvas or fireproof or water-resistant coatings.

In an embodiment, the invention provides a surveillance robot that includes a light-weight frame housing, wheels, motor compartments positioned within the light-weight frame housing, wheel motors positioned within the motor compartments and attached to the wheels, at least one sensor or sensor system for detecting any of environmental data, audio data and image data and an electronic controller that is electrically or wirelessly connected to the wheel motors and the at least one sensor system and that is wirelessly connected to an operator control unit (OCU) for receiving any of the environmental data, audio data and image data.

The light-weight frame housing is made of light-weight foam that substantially surrounds, structurally supports and protects the robot wheel motors, the at least one sensor system and electronic controller from mechanical shock during intended robot operation.

The light-weight frame housing includes front and rear light-weight frame housing sections that are connected to each other by a conduit hinge assembly to facilitate articulation between the front and rear light-weight frame housing sections. The light-weight frame housing is made of laminated layers, and wherein one or more of the laminated layers made be coated with a thermo-plastic polyurethane layer (TPU). The wheels of the surveillance robot preferably are star wheels.

In an embodiment, the invention includes a surveillance system comprising a robot and an operator control unit (OCU) for controlling the robot. The robot comprises a light-weight frame housing, wheels, motor compartments positioned within the light-weight frame housing, wheel motors positioned within the motor compartments and attached to the wheels, at least one sensor or sensor system for detecting any of environmental data, audio data and image data and an electronic controller that is electrically or wirelessly connected to the wheel motors and the at least one sensor or sensor system and that is wirelessly connected to the OCU. The light-weight frame housing is made of light-weight foam that substantially surrounds, structurally supports and protects the robot wheel motors, the at least one sensor or sensor system, the electronic controller and the OCU from mechanical shock during intended use of the surveillance system. The robot wheels can comprise star gears improve traction for climbing objects. Preferably, the robot further comprises a rear frame extension that functions as an anti-flip element for stability during robot climbing.

The operator control unit (OCU) includes OCU components including an OCU frame, a radio control unit comprising a radio control, a radio receiver, an antenna, a display device and a robot control input device. The OCU frame is made of light-weight foam that surrounds, structurally supports and protects the OCU components from mechanical shock during intended use. At least one wheel includes or may be replaced with an obstacle climbing gear that enhances an obstacle climbing ability of the robot. The OCU preferably includes a battery-life indicator to provide an amount of battery time left in a battery that powers the robot.

The light-weight frame housing of the robot has a top side and a bottom side and wherein the robot can operate when the top side of the light-weight frame housing is facing upwards or downward, depending on how the robot lands when thrown or lands in response to a fall. The at least one sensor system includes a camera is positioned in a front of the robot, in a front facing direction, an auxiliary camera positioned in a rear of the robot, in a rear facing direction, whereby the robot may capture forward-looking image data whether upside down or right-side up. Preferably, the at least one sensor system includes a microphone, a radiation sensor and/or a chemical detection sensor or system.

In an embodiment, the robot's light-weight frame housing of the robot includes front and rear light-weight frame housing sections that are connected to each other by a conduit hinge assembly to facilitate articulation between the front and rear light-weight frame housing sections. Most preferably, the light-weight frame housing is made of laminated layers, and wherein one or more of the laminated layers made be coated with a thermo-plastic polyurethane layer (TPU).

In another embodiment, the invention provides a surveillance system comprising a robot and an operator control unit (OCU) for controlling the robot. The robot comprises a light-weight frame housing separated into at least two sections, wheels attached to each of the at least two sections, motor compartments positioned within each of the at least two sections of the light-weight frame housing, wheel motors positioned within the motor compartments and attached to the wheels, at least one sensor or sensor system for detecting any of environmental data, audio data and image data and an electronic controller that is electrically or wirelessly connected to the wheel motors and the at least one sensor or sensor system and that is wirelessly connected to the OCU.

The at least two sections of the light-weight frame are made of light-weight foam that substantially surrounds, structurally supports and protects the robot wheel motors, at least one sensor or sensor system and electronic controller from mechanical shock during intended use and the conduit hinge assembly is included to interconnect or couple each section of the at least two sections to facilitate articulation between the at least two sections. The conduit hinge assembly comprises a conduit hinge and at least one conduit. Preferably, the conduit hinge assembly further comprises lateral bumpers, positioned in a conduit hinge area to absorb shock by physical contact between the at least two sections of the frame housing. The conduit hinge assembly may further comprise a deflection angle limiting strap positioned to interconnect or couple each section of the at the two sections to at least one other section, in a way that prevents the frame sections from folding over on each other. The deflection angle limiting strap is positioned proximate the conduit hinge.

Preferably, the robot's wheels are star wheels and the light-weight frame housing is covered with a fire-resistant layer. For that matter, at least one of the sections of the light-weight frame housing includes a Velcro® strap for attaching an emergency telephone for use by a user at a location to which the robot is to be driven. In an embodiment, the robot has a transponder or other means for locating GPS coordinates of the robot, and at least one of the sections of the light-weight frame housing includes a Velcro® strap or compartment for attaching a sensor for detecting dangerous gases, chemicals and radiation for use by a user at a location to which the robot is to be driven.

Also, at least one of the sections of the light-weight frame housing includes a camera which can view the sensor's display and send back the images to the OCU for viewing by the operator.

The invention also provides a method of manufacturing a surveillance robot. The method comprises acts of arranging a top, a middle and a bottom light-weight foam layer to form a light-weight frame housing, using a cutter to cut compartments, including an electronics controller compartment, a battery compartment and wheel motor compartments, into the top, the middle and the bottom light-weight foam layers, where necessary to accommodate robot constituent parts, inserting respective constituent parts into respective compartments of the top, the middle and the bottom light-weight foam layers, including inserting an electronics controller, a battery and wheel motors into the compartments, securely attaching the top, the middle and the bottom light-weight foam layers to form the light-weight frame housing with the constituent parts positioned therein, attaching wheels to the light-weight frame housing and attaching at least one sensor or sensor system to the light-weight frame housing, for detecting any of environmental data, audio data and image data.

The light-weight foam of the light-weight frame housing substantially surrounds, structurally supports and protects the robot wheel motors, the at least one sensor system and electronic controller from mechanical shock during intended robot operation. Preferably, the light-weight frame housing is formed to include front and rear light-weight frame housing sections that are connected to each other by a conduit hinge assembly to facilitate articulation between the front and rear light-weight frame housing sections. Most preferably, the light-weight frame housing is coated with a thermo-plastic polyurethane layer (TPU).

In an embodiment, the invention provides a surveillance robot that comprises a light-weight foam housing, wheels, wheel motors and an electronic controller with a memory for controlling wheel motors and wheels. The light-weight frame housing is made of light-weight foam that substantially surrounds, structurally supports and protects the wheel motors and electronic controller from mechanical shock during intended robot operation. The surveillance robot includes or operates with an operator control unit (OCU) and a transceiver wired or wirelessly connected to the electronic controller, whereby the OCU sends control signals to and receives data from the electronic controller. The robot preferably includes a sensor system and that is wired or wirelessly connected to the operator control unit (OCU) for receiving any of the environmental data, audio data and image data. The light-weight frame housing includes front and rear light-weight frame housing sections that are connected to each other by a conduit hinge assembly to facilitate articulation between the front and rear light-weight frame housing sections and is preferably made of laminated layers, and wherein one or more of the laminated layers made be coated with a thermoplastic polyurethane layer (TPU). Most preferably, the wheels are star wheels.

BRIEF DESCRIPTION OF THE DRAWINGS

The invention will be described in conjunction with the following drawings in which like reference numerals designate like elements and wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. The amount of detail offered is not intended to limit the anticipated variations of embodiments, but to cover all modifications, equivalents, and alternatives falling within the spirit and scope of the present invention, as defined by the appended claims.

Figure 1:
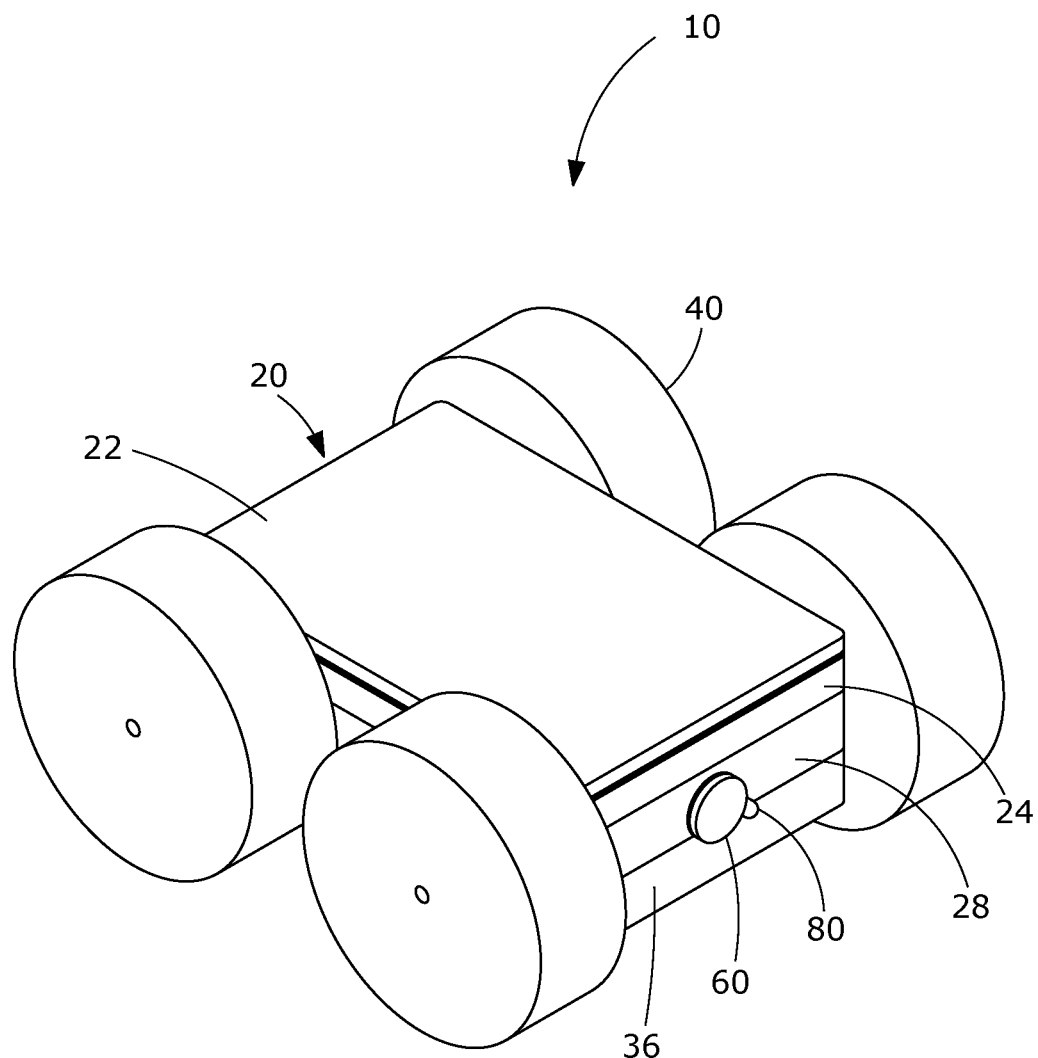
FIG. 1 depicts one embodiment of a throwable robot 10 constructed according to the invention.

FIG. 1 shows throwable robot 10 constructed according to the invention. Throwable robot 10 comprises a light-weight frame housing 20, 4 wheels 40, a camera assembly 60 and light 80. The frame housing 20 is made of foam. The frame housing 20 comprises a foam cover 22, a foam top housing or foam top housing layer 24, a foam middle housing or foam middle housing layer 28 and a foam bottom housing or foam bottom housing layer 36. The reader should note that the term housing is used interchangeably herein with housing layer. The camera assembly 60 and light 80 are mounted and embedded in the foam of the middle housing 28, in the embodiment shown. As used herein, the foam may comprise any of polyethylene, polyurethane, sorbothene, in various weights and densities, and/or any combination of the foams, and might include carbon fiber. Other components, such as compartments, are formed of polyethylene, polyurethane, sorbothene, carbon fiber, polycarbonate and thermoplastic polyurethane (TPU), in any combination.

Figure 2:
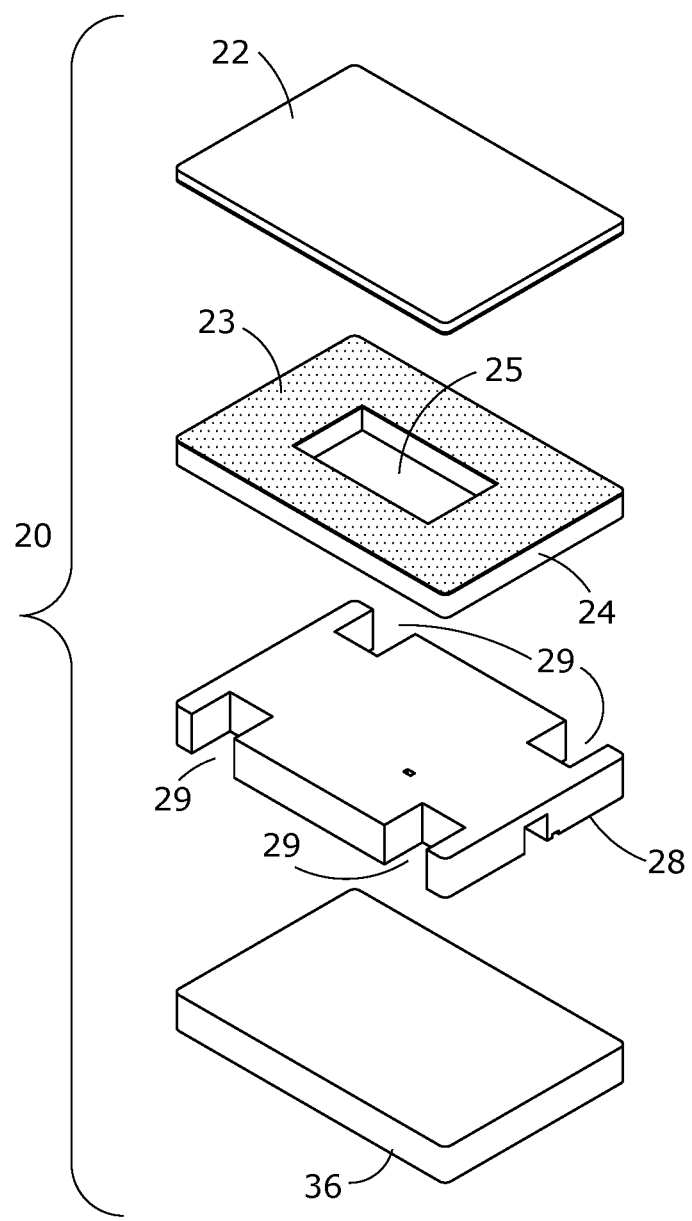
FIG. 2 presents a top perspective exploded or expanded view of a frame housing of the FIG. 1 robot.
Figure 3:
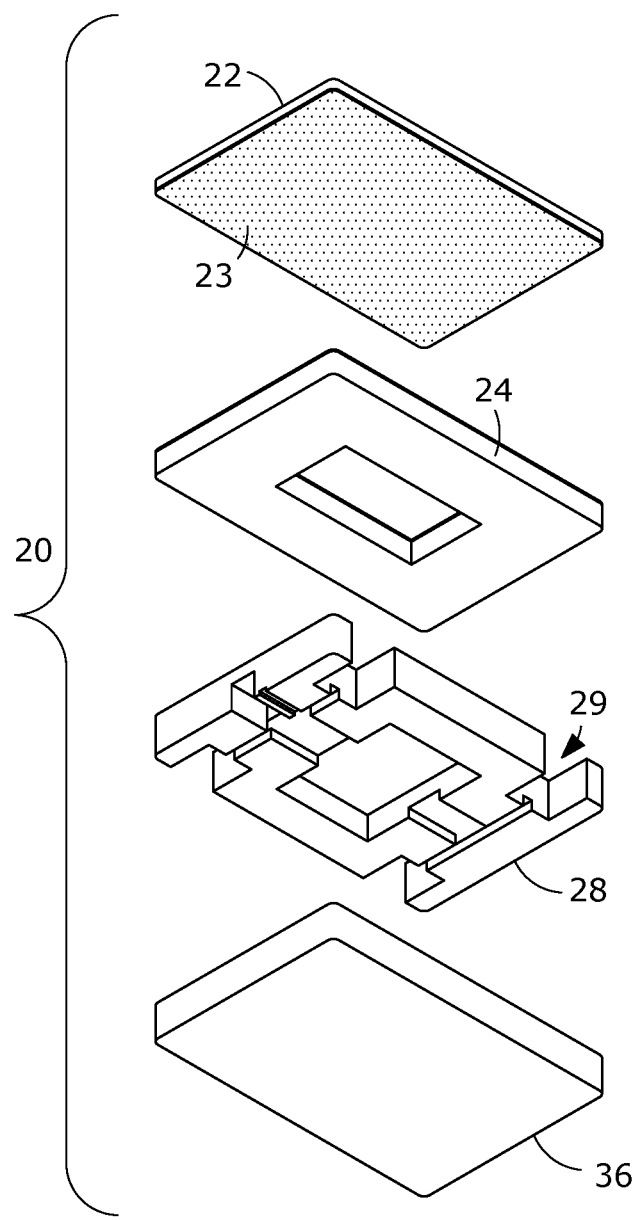
FIG. 3 presents a bottom perspective exploded view of the frame housing.

FIG. 2 includes an expanded view of the frame housing 20, including the cover 22, the top housing 24, which includes a Velcro® layer 23 for detachably connecting the top housing 24 to the cover. The cover 22 includes a complementary Velcro® layer (FIG. 3). The top housing 24 includes a cutout 25 for receiving an electronics module 90 and a battery or battery module 70. While Velcro® is proposed as an exemplary means for connecting layers of foam, or a cover layer of foam to an underlying layer of foam, the invention is not limited thereto. Any number of ways for attaching different foam housing layers may be used in place of Velcro®, such as adhesive or fasteners, without deviating from the scope and spirit of the invention. For that matter, while the frame housing of the FIG. 1 robot embodiment is shown to have a foam cover, a top housing (layer), a middle housing (layer) and a bottom housing (layer), the invention is not limited to any set number of foam housings or foam housing layers, but may be in solid or multi-layer laminate form to suit the needs of a particular robot embodiment and intended robot operation.

The middle housing (or middle housing layer) 28 includes motor compartment cutouts 29. FIG. 3 highlights a bottom expanded view of the frame housing 20, highlighting that the bottom surface of cover 22 is formed with a Velcro® later to complement the Velcro® layer 23 on the top housing 24. While the top housing 24, the middle housing 28 and the bottom housing 36 are glued or otherwise bonded together, the Velcro® connection of cover 22 to the top housing 24 allows for cover removal and access to the batteries and electronic components. In an embodiment, the lower surface of the top housing, the upper and lower surfaces of the middle housing and the upper surface of the bottom housing 36 may have respective Velcro® layers, instead of being connected by an adhesive.

Figure 4:
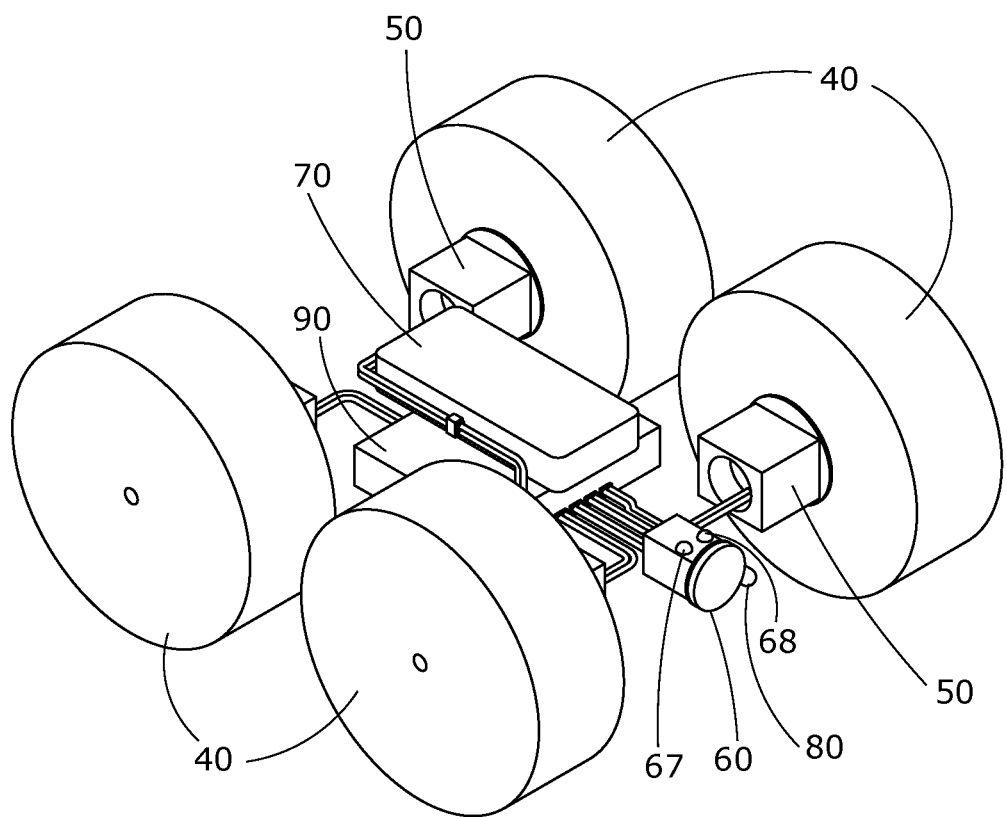
FIG. 4 presents a perspective view of the robot with a frame housing removed.

FIG. 4 presents a perspective view of the robot 10, without the frame housing 20, to highlight the robot's operational components. Central are the battery 70 and electronics 90 modules (or compartments), which electrically connect to the motors in the wheel motor compartments 50, the camera assembly 60, any sensors and the light 80. The wheel motor compartments 50 are detachable from the respective wheels 40, allowing access to set screws 54 (see FIG. 5). The set screws operate to secure the motors 52 into the wheel motor compartments 50.

Figure 5:
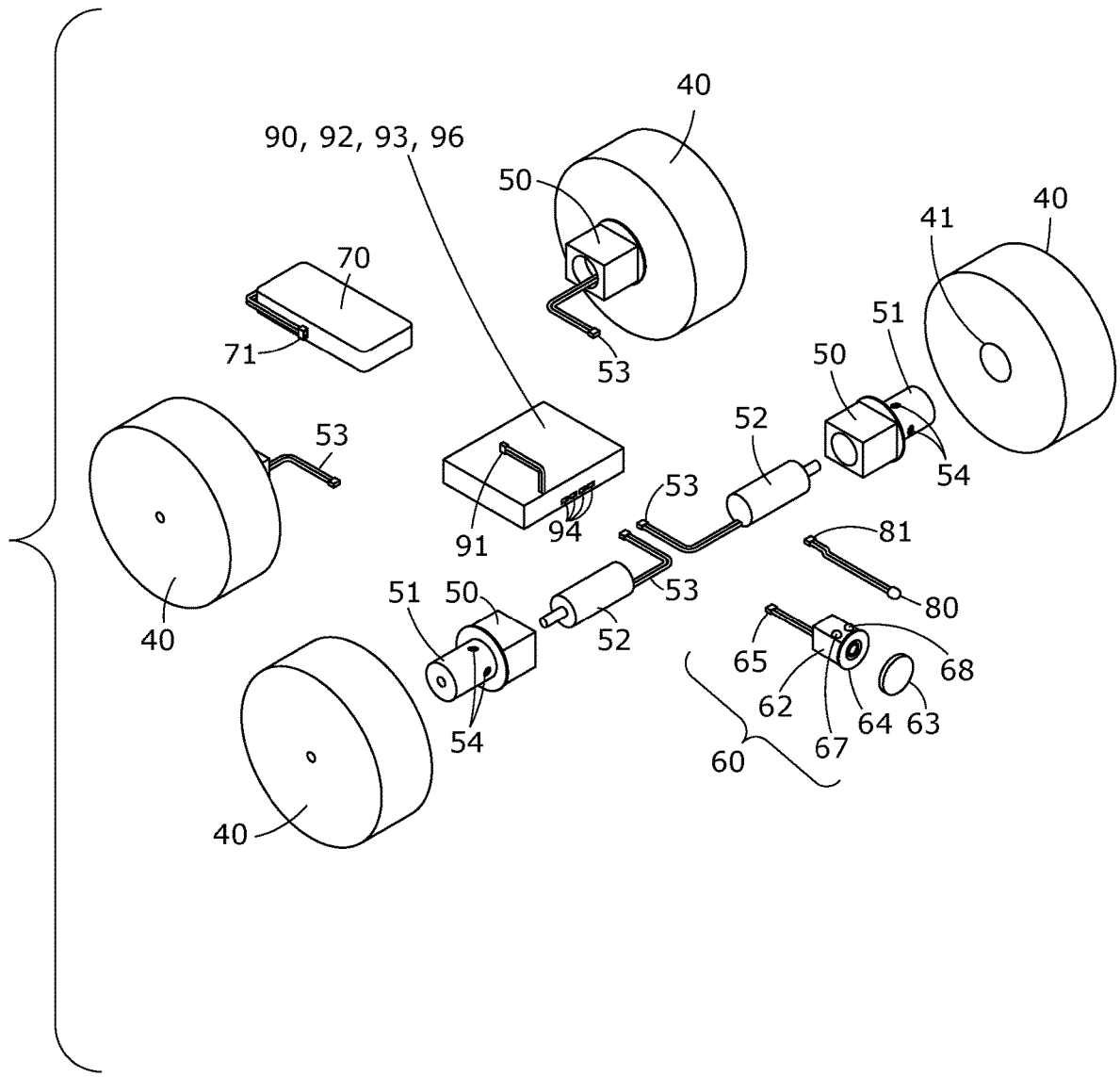
FIG. 5 presents an exploded or expanded view of the operational components of the FIG. 1 robot.

FIG. 5 is an exploded or expanded view of the operational components of robot 10, highlighting the electrical and physical connections between the operational components, as shown. For example, the battery compartment or module 70 is shown to include a connection element 71 that connects to a first connection element 91 of the electronics compartment or module 90. Each of the motors 52 include a respective connection element or wire 53, for electrical connection to connectors 94 in the electronics compartment or module 90. The light 80 includes connection element 81. The camera assembly 60 is shown to comprise camera housing 62, camera 64, camera cover 63, connection element 65, a speaker 67 and a microphone 68. The connection elements 65 and 81 of the camera assembly 60 and light 80, respectively, also connect to connectors 94 of the electronics compartment 90.

Figure 6:
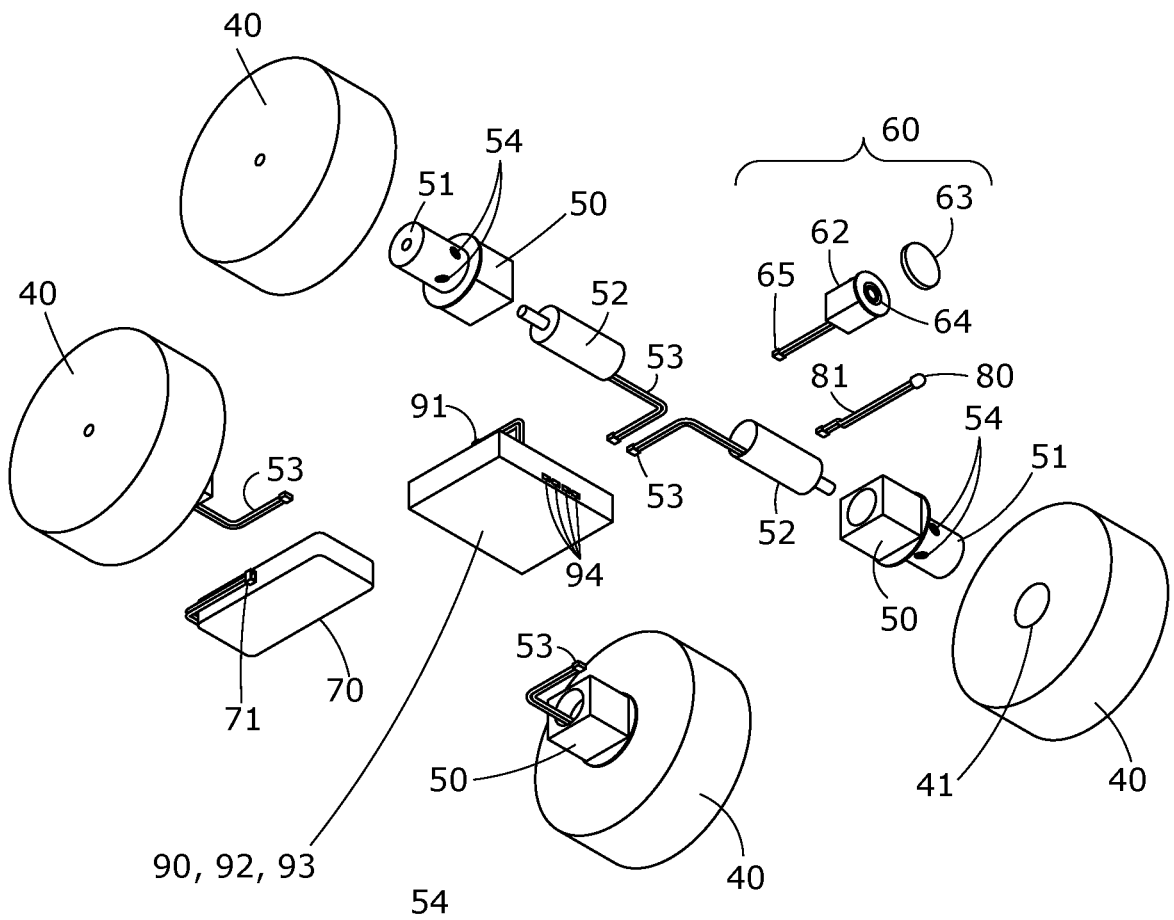
FIG. 6 presents a bottom perspective view of the robot's operational components, highlighted in FIG. 5.

An electronic controller 92 is shown as part of electronics compartment or module 90, which communicates wirelessly with electronics in an operator control unit (OCU) 200 (not shown in FIG. 5). The electronic controller 92 controls the motors 52, camera 64 and light 80 (and any other sensors if included). Preferably, electronic controller 92 includes a memory for storing application programs that are processed by the controller 92. Another (e.g., second) connection element 93 is available for physical connection to the electronics compartment 90, and therefore, the controller 92 and memory therein, for diagnostics, to push and pull data including data comprising application programs, etc. Camera assembly speaker 67 and microphone or audio pick-up 68 are connected to electronic compartment or module 90, which sends and receives audio communication to the OCU. An antenna element 96 is included for communicating wirelessly between the robot 10 and the OCU 200, and therefore, connects the electronics controller to the OCU. Such communication includes communicating the control commands to the robot 10. Communications alternatively may be carried out directly through the hard-wire connections (e.g., via connection element 93), which accommodate electrical signals exchanging diagnostics data and operational commands, to push and pull other data including data comprising application programs, etc. FIG. 6 is a bottom perspective view of the operational components of robot 10.

The geared motors 52 drive the wheels 40 connected to them enabling the robot 10 forward, reverse, left and right control, via the OCU 200. The axle portion 51 is a fixed part of the wheel motor compartment 50 that is designed to slide into a rim 41 thus stabilizing the wheel motor compartment when fixed therein. As such, the axle portion receives any shock passed from the wheel 52 and rim 41 and transfers the shock through the wheel motor compartment 50 and into the foam. This arrangement whereby mechanical shock is communicated into the foam safeguards the motors from damage when the inventive robot is dropped. The axle portions 51 are connected to the inner wheel (such as by friction fit) to control rotation of the wheel 40.

The robot 10 carries any number of sensors including but not limited to visible light cameras 62, low light cameras, near infrared cameras, and thermal cameras, radiation detectors, without limitation. All the cameras 62 zoom in cooperation with the OCU 200. Illumination including but not limited to visible and infrared lighting can be added to any embodiment in addition to the light provided by light 80.

As mentioned, the inventive robots are designed to withstand high impacts by the foam frame housings, (e.g., foam frame housing 20). The foam frame housings will allow the robots to be thrown, i.e., up stairs or into an open window of a structure, bus, plane, warehouse, or tumble down stairs, embankment or the like, because the foam absorbs mechanical forces that might otherwise break the robot apart, or damage its components and modules were the robot was constructed conventionally. The inventive robots are throwable because the foam which forms the housing frame absorbs shock.

Please note that the inventive robots also are intended for reconnaissance and surveillance. That is, the unique robot designs enable the robots to investigate tight spaces, such as spaces under vehicles, within crawl spaces, indoors and outdoors. For example, the robot 10 can be thrown over a fence to investigate a fenced in area or any type of chemically or otherwise contaminated environments, such as nuclear power plants or even reactors themselves. For that matter, the robot can be deployed from a drone, for example, on to a roof or other dangerous or hard to access environments, such as a hijacked oil tanker or cruise ship.

The robot shown in FIGS. 1-6 can climb over objects, such as objects up to 5 inches tall, but is not limited thereto. Moreover, by adding an internal component compartment with a propulsion unit (not shown), for example, the robot so modified can climb stairs (see below).

A robot operator can use the operator control unit (OCU) 200 to drive the robot 10 with the aid of a video monitor, up to 1000 feet and as such, the robot can be operated safely from outside a structure that is being cleared by the user/operator (e.g., SWAT personnel). The robot 10 can be thrown into a window or door of the structure before the SWAT Team members enter, for reconnaissance. Then, a SWAT Team member having (or wearing) equipment to enable them receive video from the robot (such as an OCU or electronic device in wireless communication with the OCU), can receive a live video feed from the robot before they enter the structure. Once inside, as the robot moves throughout the structure, such SWAT Team members can move into the structure and communicate with the robot operator, who presumable is safely outside the structure directing the robot's course through the structure. Upon entering a room, for example, the robot is able to provide the SWAT Team member (with video equipment) a real-time view of the inside of the room, before he or she enters the room. The robot 10 can be driven down stairs into basements or thrown by the Swat Team members upstairs, to further safely clear multi floor structures. Larger robots can be produced using the modules to make systems capable of investigating vehicles, truck beds and other suspicious objects at a safe distance, without deviating from the scope and spirit of the invention.

The robot 10 and OCU 200 can be operated for hours at a time, depending on the battery selected for the task. The robot and OCU combination has the potential to be disruptive to the current state of the art in Public Safety Robotics, with its relatively low manufacturing cost, ease of use, light-weight and capability, due to the foam-based construction of the robot and OCU to absorb repeated high shock impacts without damage to the respective constituent parts.

Figure 7:
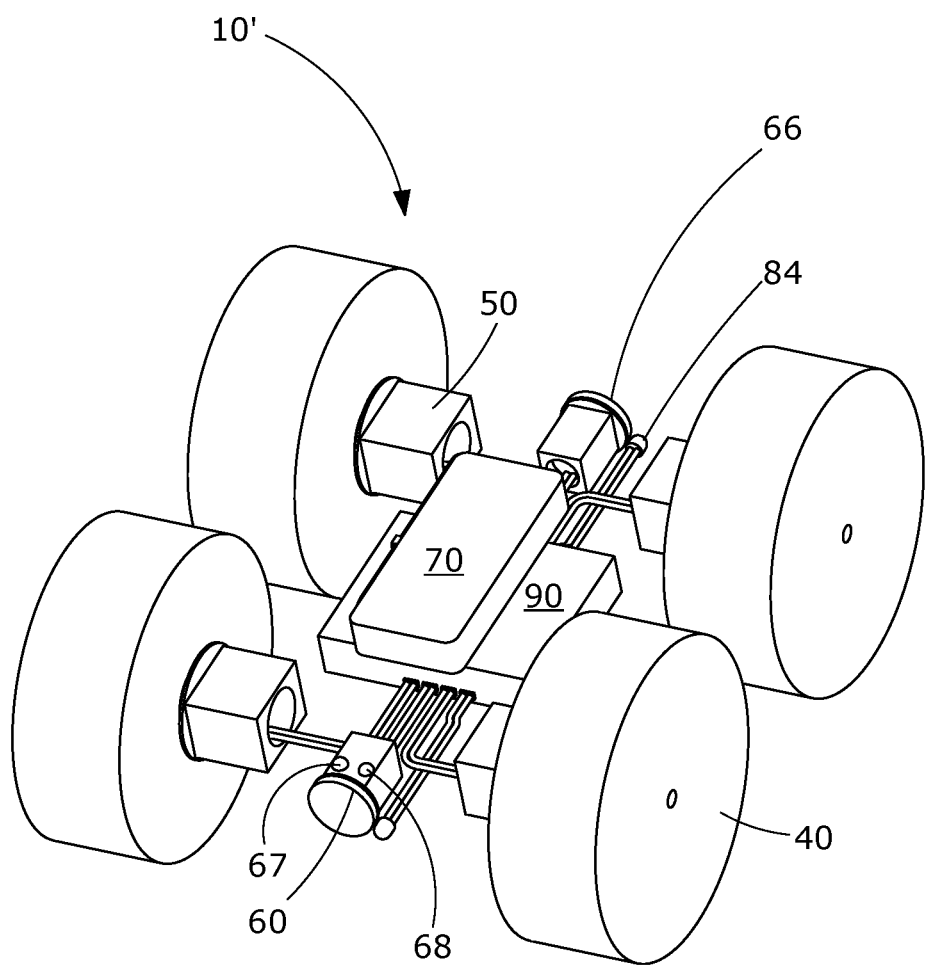
FIG. 7 presents a top perspective view of an alternative embodiment of the robot of FIGS. 1-6, also constructed according to the invention.
Figure 8:
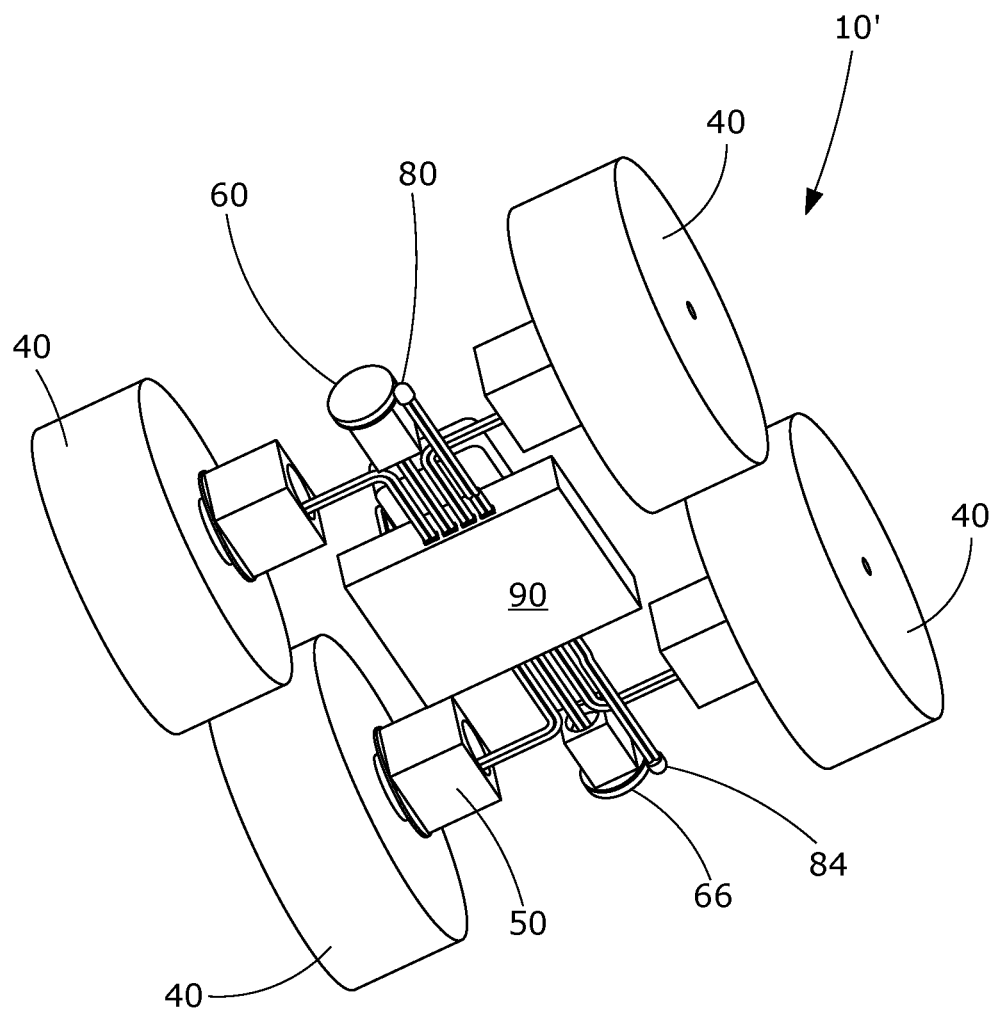
FIG. 8 presents a bottom perspective view of the robot FIG. 7.

FIGS. 7 and 8 together depict another embodiment of a robot 10', constructed according to the invention. The robot 10' depicted in FIGS. 7 and 8 includes a second camera assembly 66, which also comprises a camera housing 62, a camera cover 63, a camera 64 and connection element 65, where the connection element 65 connects to a connector 94 in electronics in the electronics compartment or module 90. FIG. 8 presents a bottom perspective view of the robot 10' of FIG. 7. The two cameras, one each mounted on the front and rear of the robot, are orientated 180 degrees to each other (upside down to each other) and are selectable (for capturing data from one, or the other, or even both designs) using a camera orientation selection switch 225 on the OCU 200 (see FIGS. 9A and 9B). This is done so that no matter which way the robot lands after it is thrown, at least one selectable camera is always orientated right side up when viewed from the monitor on the OCU.

Figure 9A:
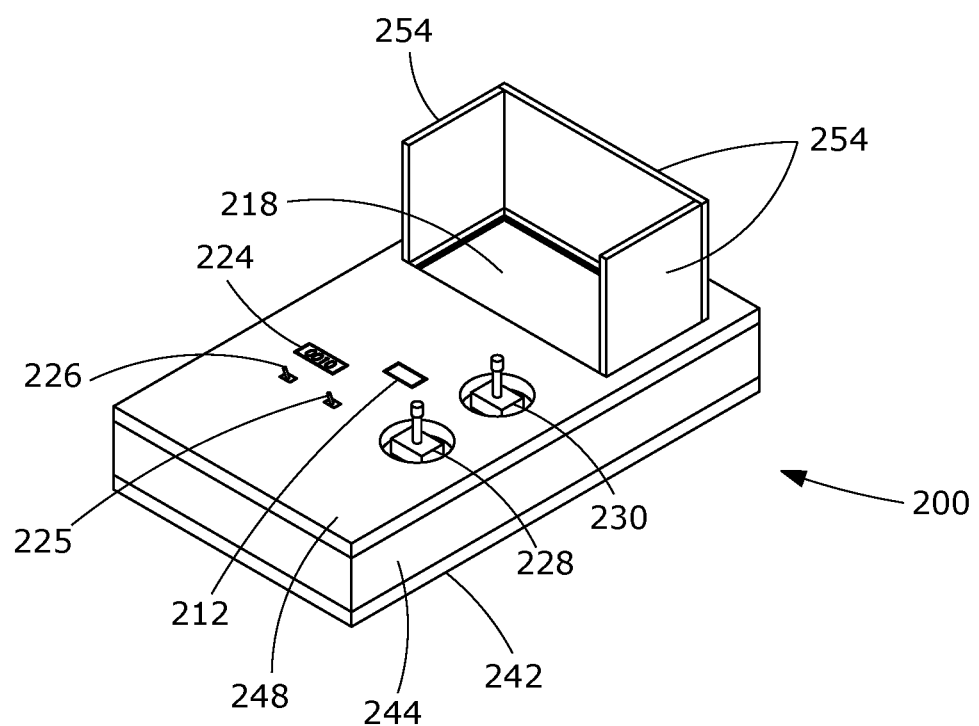
FIG. 9A depicts an operator control unit (OCU) 200, constructed in accordance with the invention.
Figure 9B:
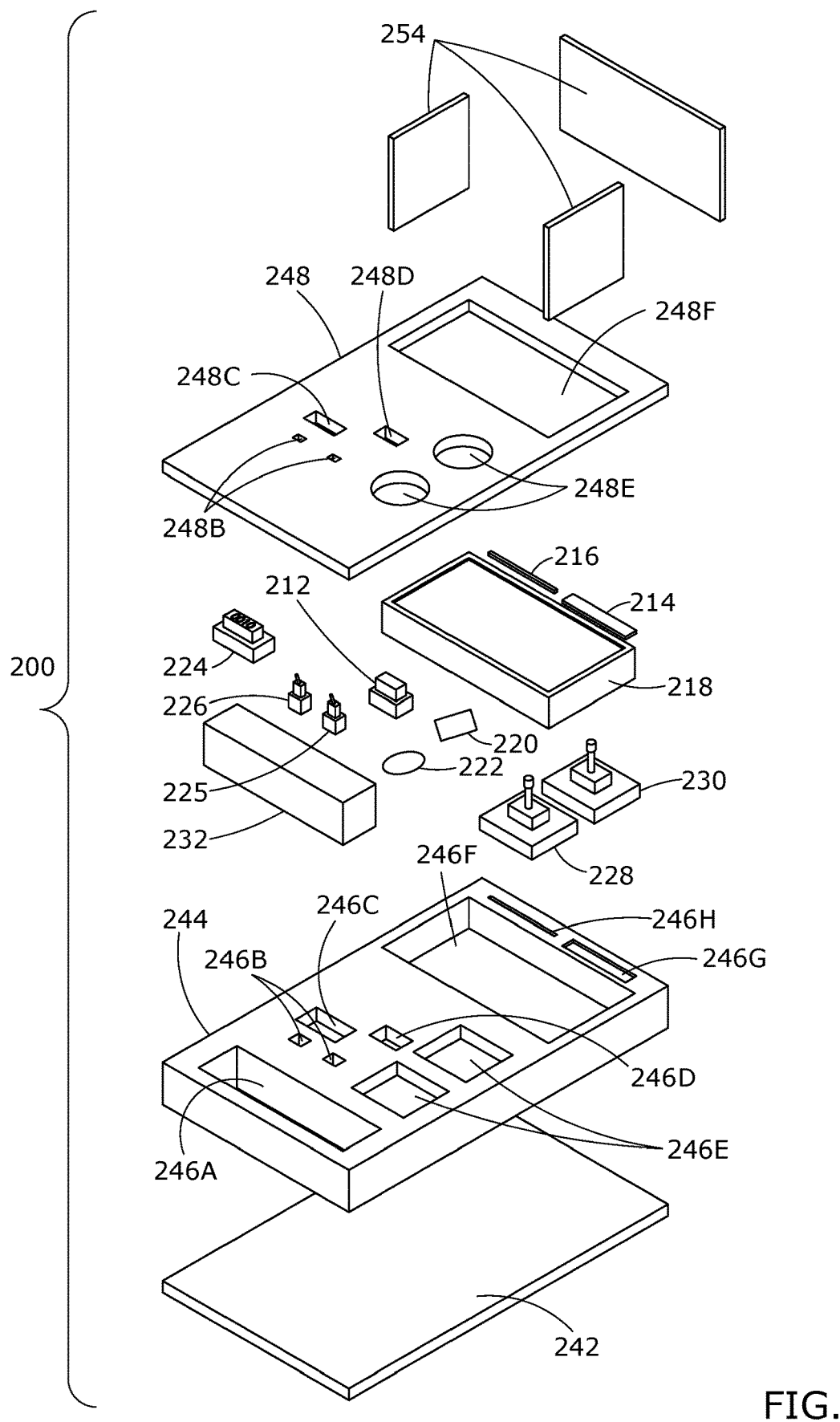
FIG. 9B presents an exploded or expanded view of the OCU 200 depicted in FIG. 9A.

FIGS. 9A and 9B depict one embodiment of the operator control unit (OCU) 200, for controlling the robots according to inventive principles. The OCU 200 comprises a radio control unit 212, a radio receiver 214, an antenna 216, a display device 218 (e.g., a color video monitor), a microphone 220, a speaker 222, a voltmeter 224, switches 226, a robot control input device 228 (e.g., a joystick), a robot arm control input device 230 (joystick) and a battery 232. The reader should note that while the input devices are depicted separately, same is for exemplary purposes only, where the inventive robot and OCU may include a single input device, such as a joystick, in order to control the robot operation, including a robot arm if present, or may rely on some other type of command input device, such as a voice interpreter, to control the robots and robot arms, if included. The OCU 200 is used to remotely control the inventive robot 10 (as well as the other robot embodiments, described in greater detail, below). The OCU receives a live audio/video stream captured from one or both robot's camera assemblies 60 and sent via the electronic controller 90. The robot camera assemblies preferably capture sound (camera microphone 68) and image data (camera 64). The video data is presented to the user/operator on the display device 218, where the sound data is presented by a speaker 222 on the OCU. The OCU microphone 220 can send operator/user voice data to the robot's speaker 67, for example, commands to a hostage taker or a gunman in a house, warehouse, etc.

Like the robot, the OCU 200 is constructed with a housing frame formed of light-weight, vibration absorbent materials (e.g., foam). The material may be, but is not limited to polyethylene, polyurethane, sorbothene, carbon fiber, PVC, thermoplastic polyurethane (TPU) and various 3d printed materials. As such, the OCU 200 and the components therein are protected against physical forces (mechanical shocks) resulting from the OCU being dropped or thrown, and otherwise during intended operation.

In greater detail, the OCU 200 comprises a frame housing formed with a bottom foam layer 242, a middle foam layer 244 positioned on the bottom foam layer 242. The middle foam layer is shown with various cutouts 246A (battery), 246B (switches), 246C (voltmeter), 246D (radio control unit), 246E (robot control input devices), 246F (display device), 246G (radio receiver) and 246H (antenna), within which middle foam layer seats and surrounds with foam (to protect) the various components of the radio control unit of the OCU. A top foam layer 248 is attached to the middle foam layer 244 (for example, by adhesive or respective Velcro® layers), including cutouts 248B (switches), 248C (volt meter), 248D (radio control unit, and 248F video display monitor (device) and 248E (robot and robot arm input devices). Preferably, the display device includes flaps 254 that flip-up about hinged connections (or are detachably inserted), to block light from interfering with a user/operator's ability to see the content presented by the display device 218, during intended operation (for example, sunlight). The flaps, while preferably made of light-weight materials, must be made to be durable for long-term use.

The OCU 200 receives the audio and video signals from the robot via the audio/video receiver and displays the images on the display device for the OCU operator to see. Using these images, the operator can maneuver the robot around objects using the robot control joy stick. Inputs from the robot control are transmitted to the robot and control forward, reverse, left and right movements of the robot.

Figure 10:
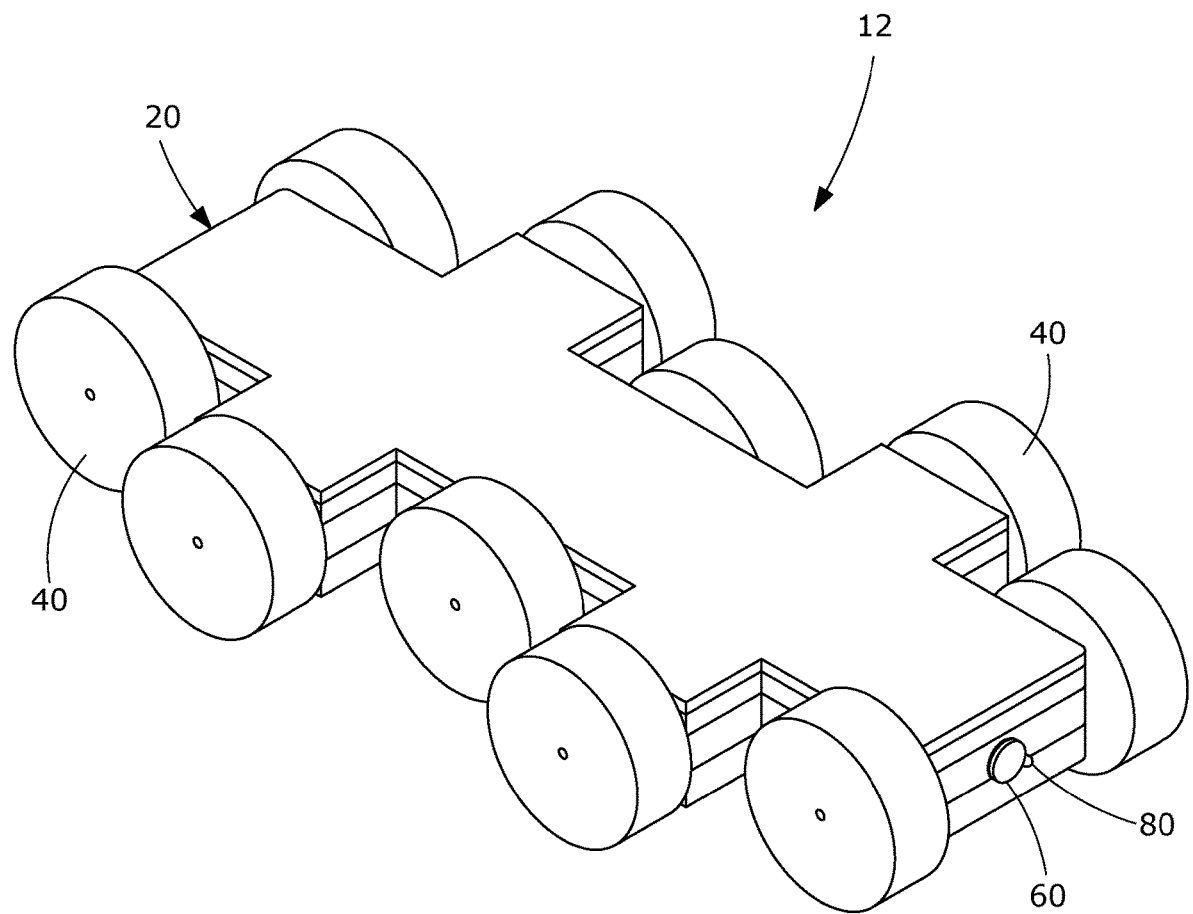
FIG. 10 depicts another embodiment of a robot 12, constructed according to the invention.

FIG. 10 depicts an embodiment of a robot 12 constructed according to the invention. Robot 12 is constructed equivalently to the constructions of the robot 10 and 10', but includes 3 extra pair of wheels 40, motors and motor connections for driving and controlling the additional wheels, as shown. That is, additional motors 52, housed in additional motor compartments 50, are electrically connected to connectors 94 in the electronics compartment or module 90 and to controller 92, thereby. The axle portion 51 of the motor compartments are connected to the inner wheel (such as by friction fit), via rim 41, to control rotation of the wheel 40. Accordingly, the OCU 200 can control wheels 40 by use of various control functions implemented by the OCU in cooperation with the electronics controller 92. In the 10-wheel embodiment, the 10 wheels allow the robot to more readily climb obstacles, such as curbs, stairs, staircases, etc.

Figure 11:
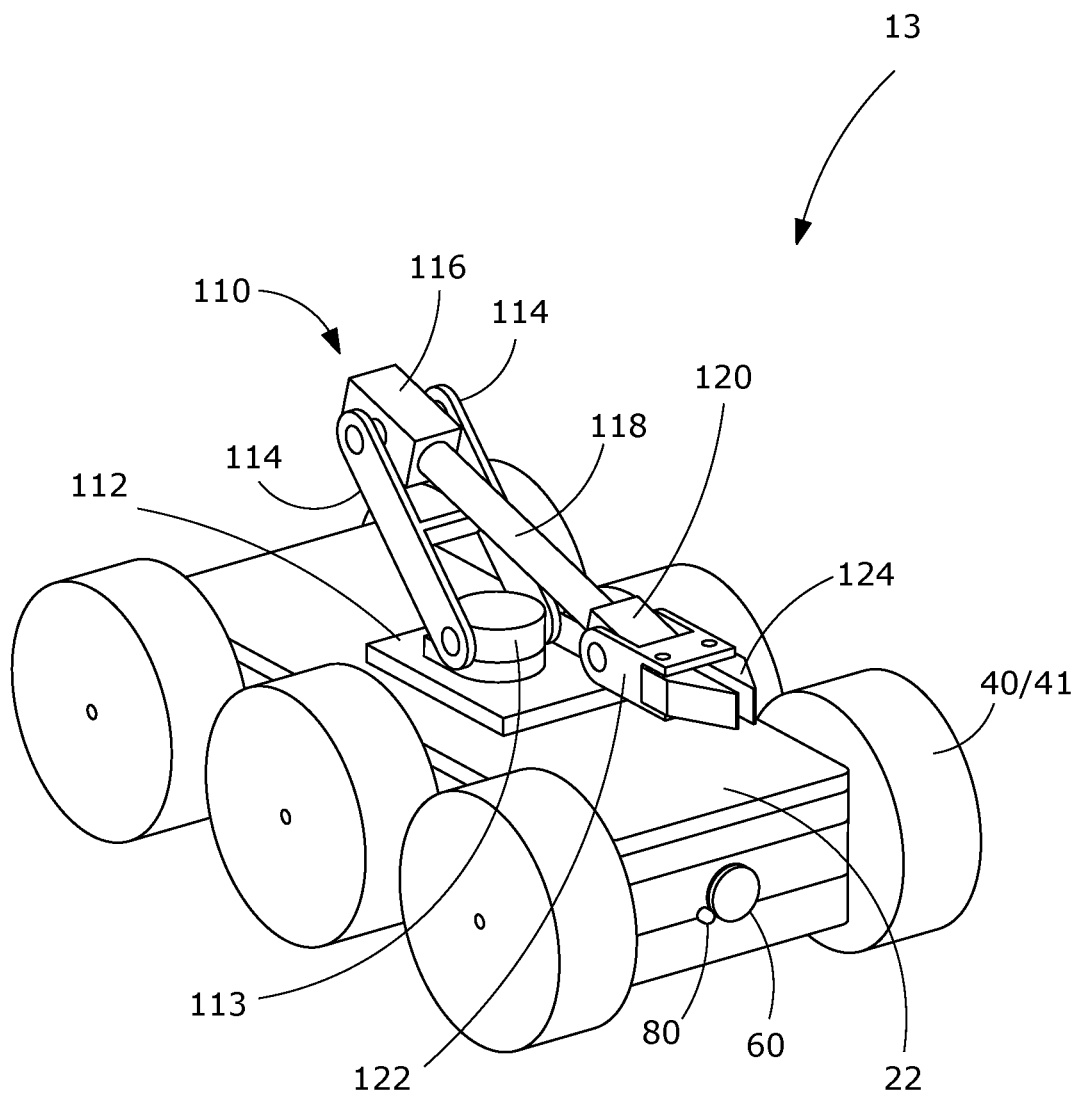
FIG. 11 depicts another embodiment of a robot constructed according to the invention.

FIG. 11 depicts another embodiment of a robot 13 constructed with a light-weight foam housing, that is a variation of the robots 10, 10'. That is, robot 13 includes 6 wheels 40, motors 52, motor axles 51, wheel motor compartments 50, and connection elements or wires 53, that are controlled by the OCU 200 via the electronics controller 92. In addition, robot 13 includes a mechanism for grasping 110, and therefore carrying, objects. The OCU 200 controls the grasping mechanism using operator input via switch 226. The grasping mechanism 110 is connected to the cover 22 by a base element 112, upon which is arranged a rotational element 113. Lifting elements 114 are articulated to the rotational element 113. A robotic arm 116 is connected to the lifting elements 114. Robotic arm 116 includes a link 118 and a connector 120 that connects the arm 116 to claw control 122 and claws 124.

Figure 12A:
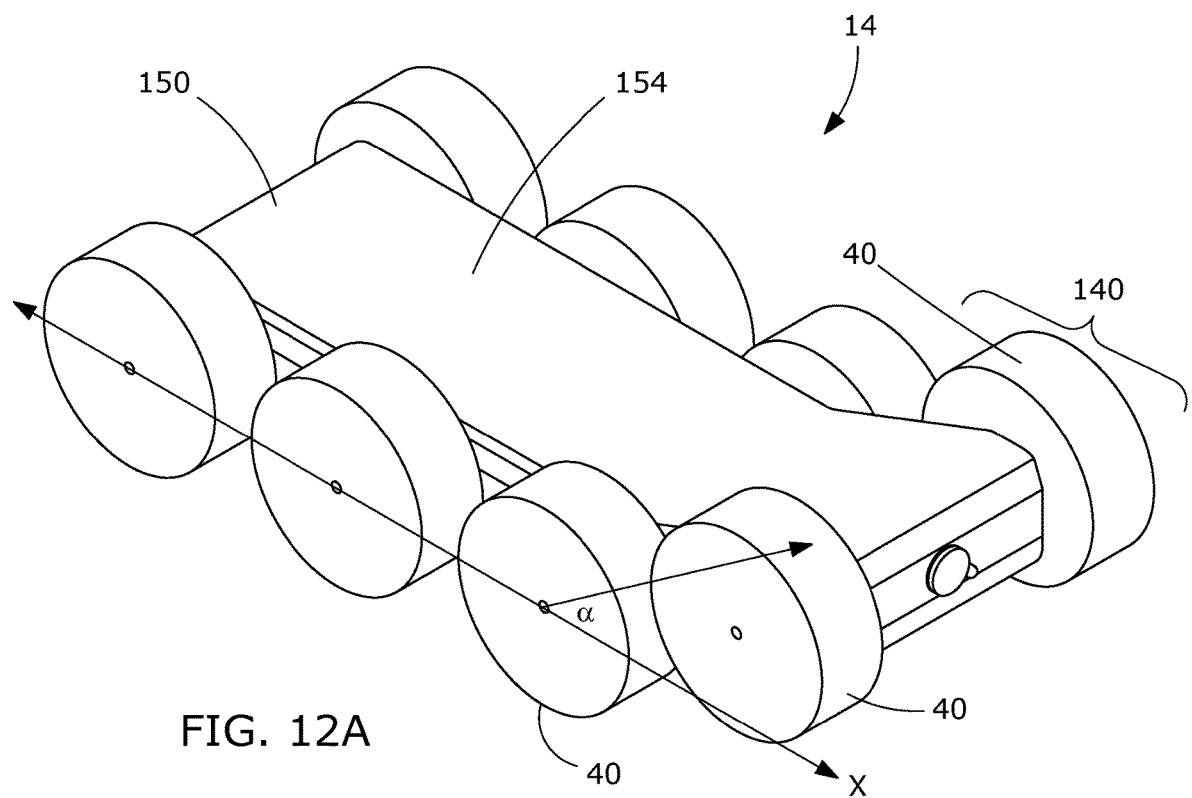
FIG. 12A depicts another embodiment of a robot constructed according to the invention.
Figure 12B:
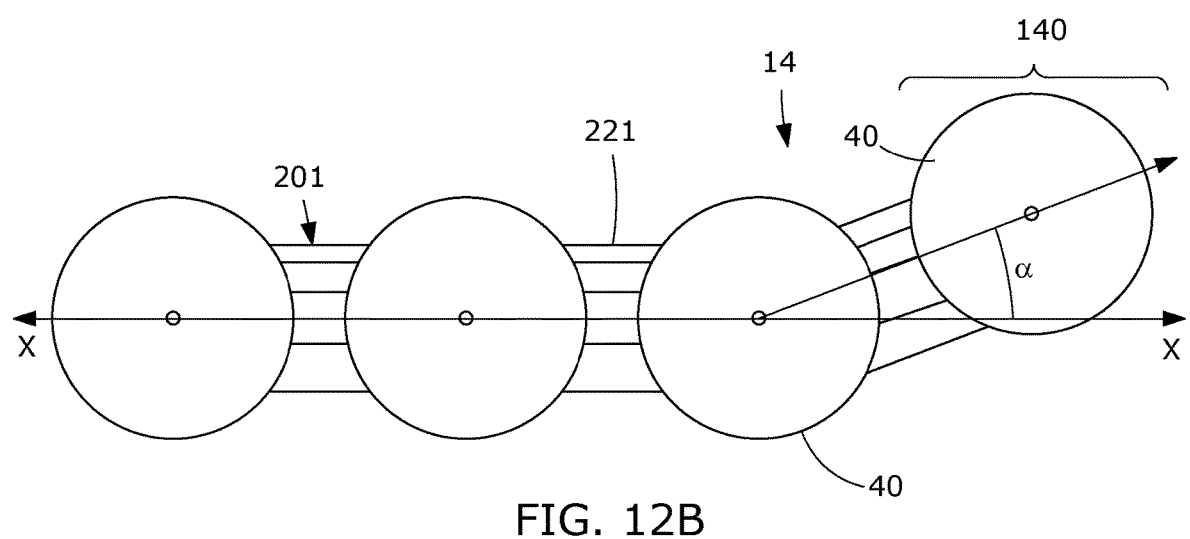
FIG. 12B presents a side view of the robot depicted in FIG. 12A.

FIGS. 12A and 12B together depict another embodiment of a robot 14 constructed with the light-weight frame construction according to the invention. As can be seen from FIGS. 12A and 12B, the robot includes 4 pairs of wheels 40, in 4 sections and an extended housing frame 150. A forward wheel-pair section 140 is formed at an acute angle of attack to facilitate climbing over obstacles. That is, a portion of the housing frame 150 that is extended to accommodate the extra 2 wheels 40 extends upward from a plane of the extended frame housing cover 154 at an acute angle α (e.g., 25 degrees) from a central axis X of the robot. The extra wheels and acute angle of attack allow for overcoming obstacles and for stability of the robot. Section 140 may include more than one pair of wheels 40, for example, a 5$^{th}$ pair. Motors 52, motor axles 51, wheel motor compartments 50, and connection elements or wires 53, are included for each of the wheels. An OCU 200 and the electronics controller 92 controls each of the wheels individually, like in the other robot embodiments.

Figure 13:
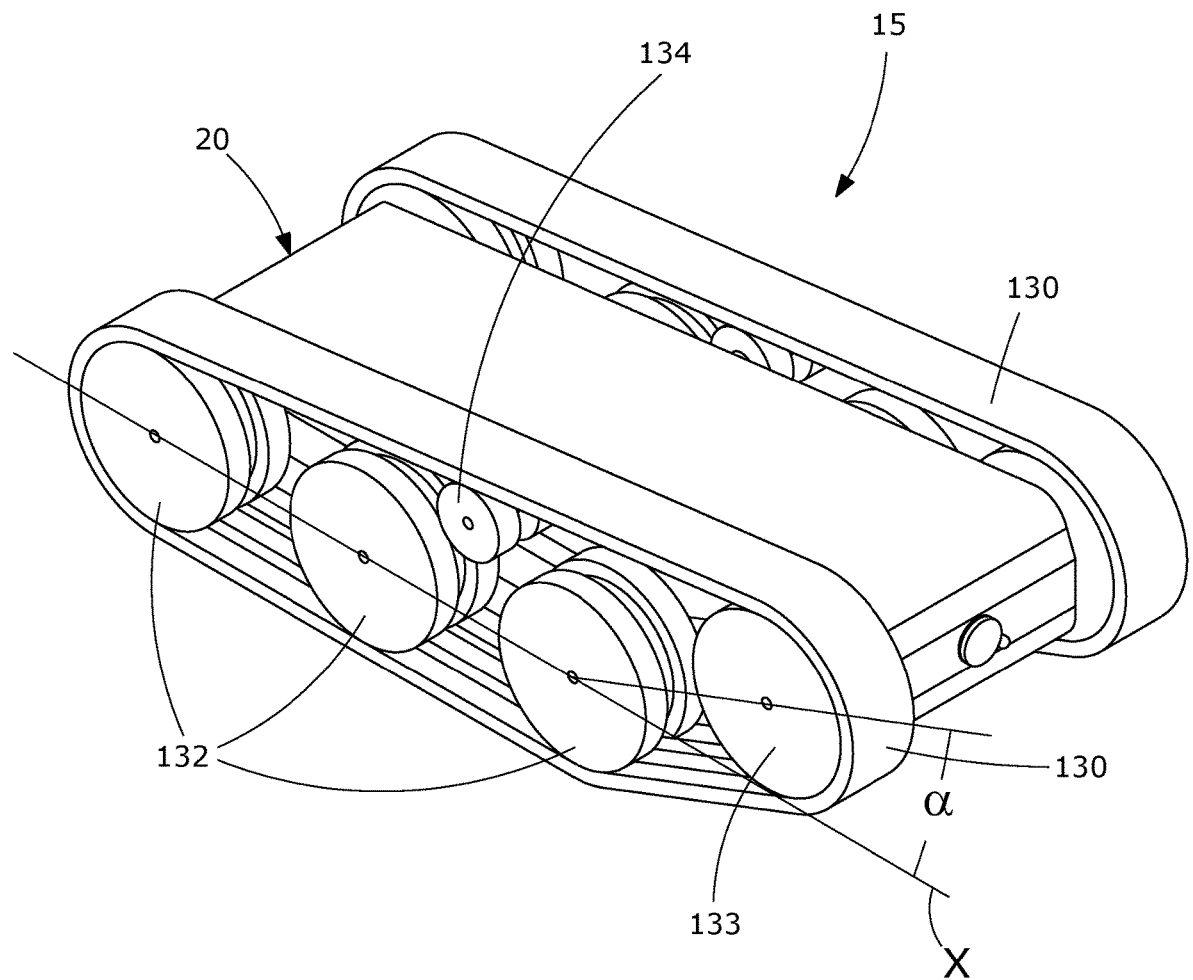
FIG. 13 depicts another embodiment of a robot constructed according to the invention.

FIG. 13 depicts another embodiment of a robot 15 constructed with a light-weight foam frame according to the invention, but instead of wheels 40, motors 52, motor axles 51, wheel motor compartments 50, robot 13 includes a pair of track assemblies 130, positioned on opposing sides of the robot. The opposing track assemblies 130 each comprise rollers 132, 133 and 134. Tracks 130 are driven by a prime mover (e.g., one or more electric motors, not shown) through any one or more pair of opposite-side rollers. Any of rollers 132, 133, 134 may be driven rollers directly connected to a rotational drive mechanism of the prime mover. The prime mover is fully controlled by controller 92 and, therefore, by the OCU 200 and user controls thereon. Roller 133 is positioned above line of rollers 132 (at a slight angle of attack (a) in relation to the central axis (x) of the robot 15, to readily climb and overcome obstacles.

Figure 14:
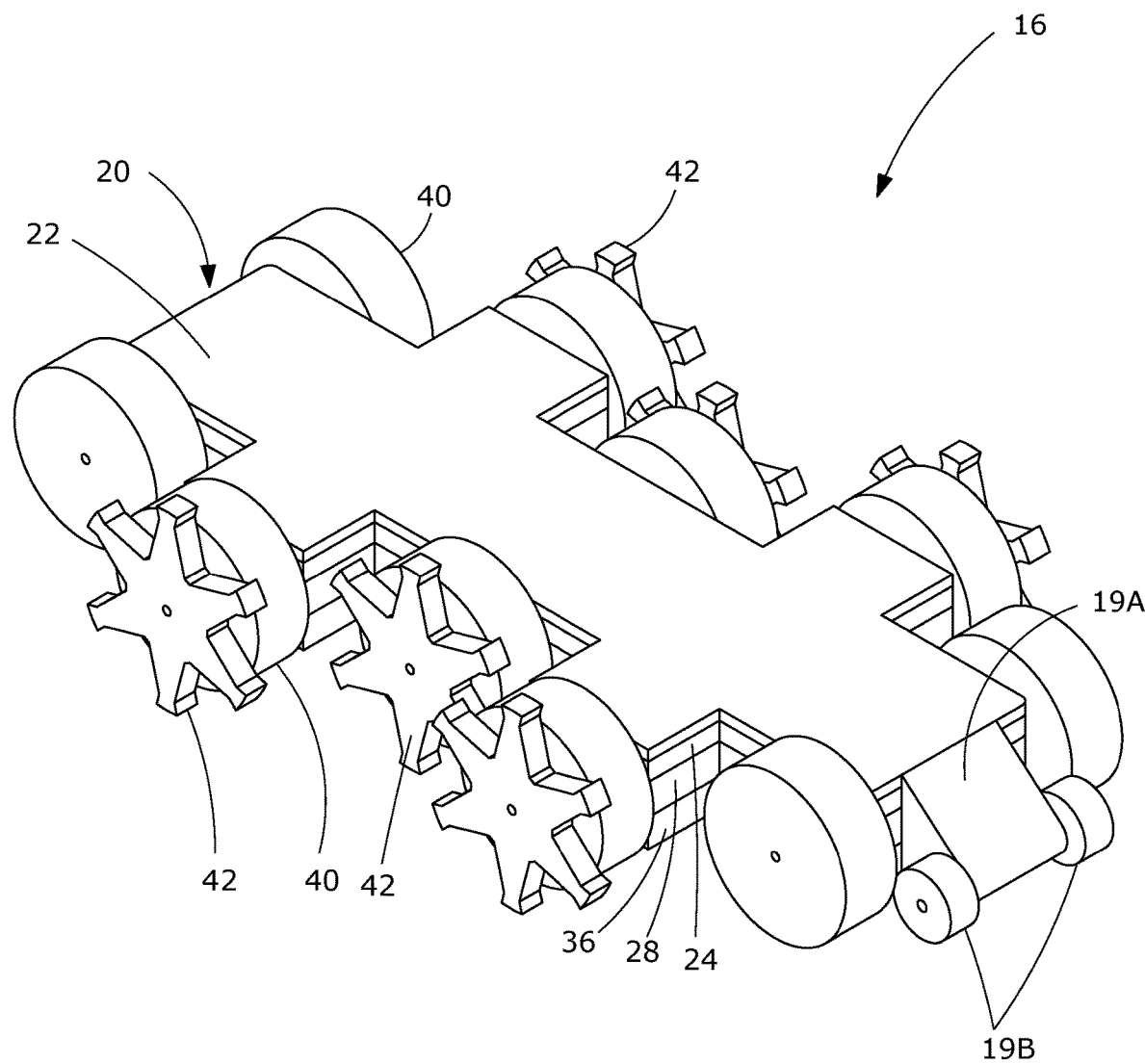
FIG. 14 depicts another embodiment of a robot constructed according to the invention, with stair climbing gears and anti-flip wheels.

FIG. 14 depicts an embodiment of a robot 16 constructed with a light-weight foam frame according to the invention. Robot 16 is constructed equivalently to the construction of the robot 12 with the addition of obstacle climbing gears, or star wheels 42, which are attached to 6 of the wheels 40, as shown. Also included is an anti-flip element or extension 19A. Anti-flip element or extension 19A includes a pair of anti-flip wheels 19B mounted thereon. The anti-flip element 19A is mounted at the rear of the robot 16 and while depicted as shown, a variation may be utilized that does not include wheel(s) 19B. For that matter, in a different form, anti-flip element 19A includes a handle for carrying or throwing the robots constructed according to the invention.

Figure 15:
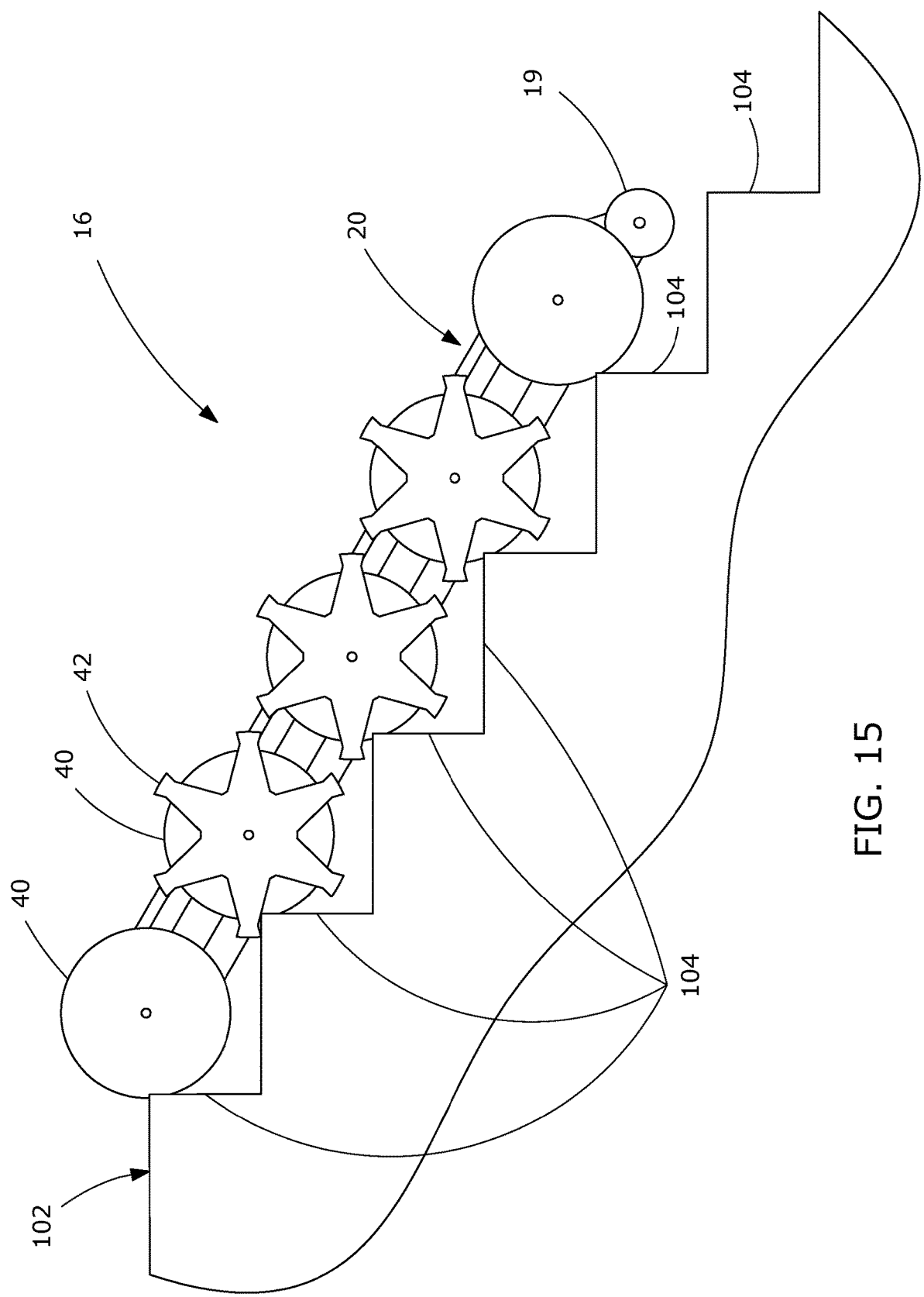
FIG. 15 depicts the robot depicted in FIG. 14, climbing stairs of a staircase.

The obstacle climbing gears 42 enable the robot to better climb stairs and other obstacles, for example, by making direct contact to stair step surfaces, particularly with steps having cantilevered sections, to improve gripping and locomotion up and over. The anti-flip element 19A (with or without a handle and with or without wheel(s) 19B) keeps the robot from flipping back over when climbing obstacles at steep angles. FIG. 15 depicts robot 16 climbing a staircase 102, comprising separate stairs 104.

Figure 16:
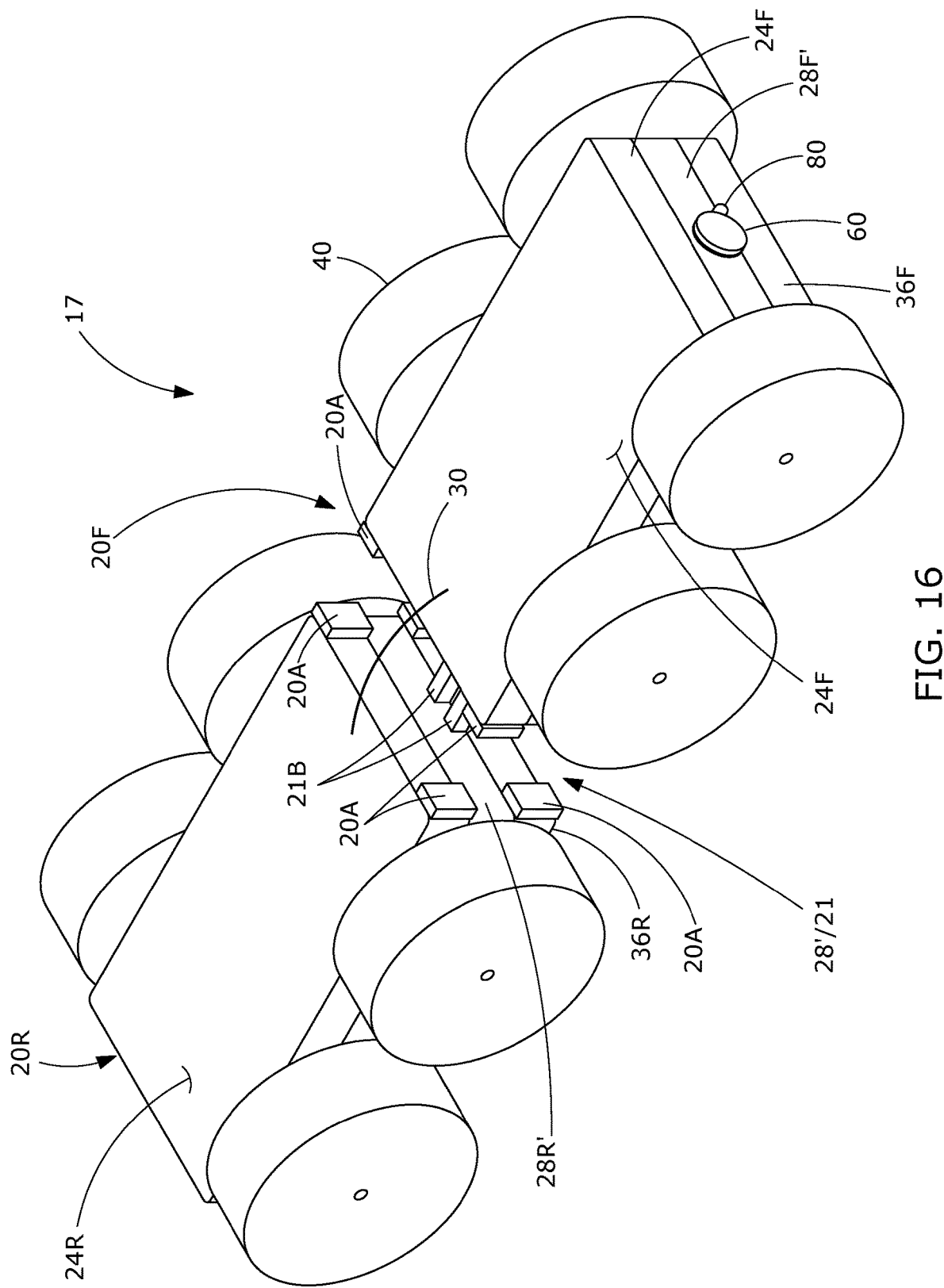
FIG. 16 depicts an embodiment of a robot constructed according to the invention and including two articulating sections, where each of the two sections is configured with 4 wheels.
Figure 17:
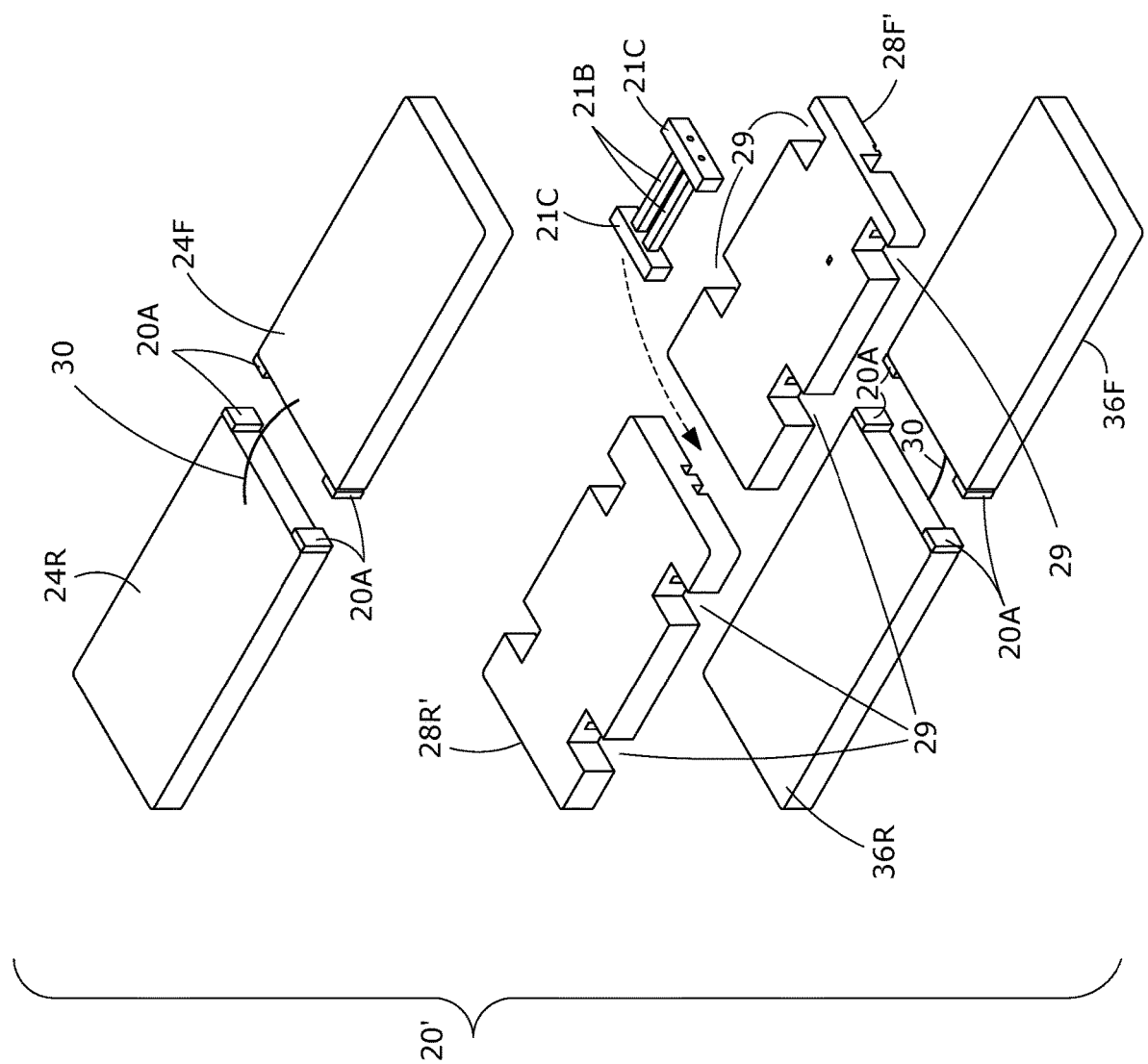
FIG. 17 depicts an exploded or expanded top perspective view of a frame housing of the robot of FIG. 16.
Figure 18:
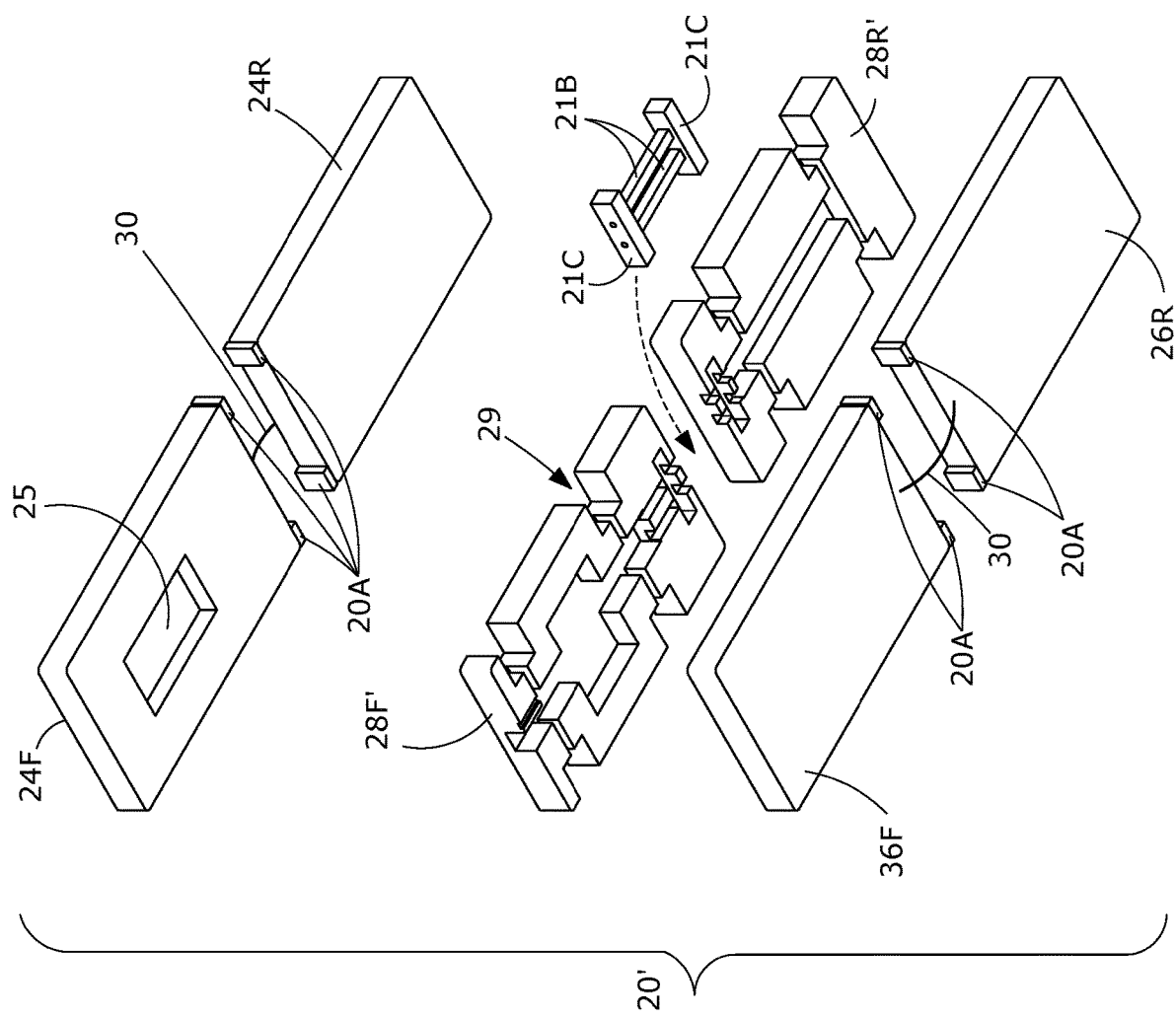
FIG. 18 depicts an exploded or expanded bottom perspective view of the robot of FIG. 16.

FIG. 16 depicts another embodiment of a light-weight surveillance robot 17 constructed with the inventive light-weight frame design of the invention; FIG. 17 depicts an exploded or expanded top perspective view of the exploded or expanded view of a frame housing 20' of the FIG. 16 (robot 17); and FIG. 18 depicts an exploded or expanded bottom perspective view of the exploded or expanded view of a frame housing 20' of the FIG. 16 (robot 17).

Unlike the other robot embodiments, the robot 17 of FIG. 16 includes a pair of the light-weight frame housings 20F, 20R, interconnected by a conduit hinge assembly 21 that is positioned in a foam middle housing 28'. The foam middle housing or housing layer 28' comprises a front foam middle housing 28F' and a rear foam middle housing 28R' connected by the hinge assembly 21. The conduit hinge assembly 21 is positioned in a hinge area 21A that is located between the ends of the front and rear foam middle housings 28F', 28R'. The conduit hinge assembly 21 also includes conduits 21B, which allow for hard wires (such as connection elements or wires 53) extending between the front and rear light-weight frame housings 20F, 20R, and any electrical components therein. The conduits 21B are embedded in foam conduit anchors 21C, as shown. The conduits and conduit anchors preferably are made of thermoplastic polyurethane (TPU).

Robot 17 also includes front and rear bottom foam housings, 36F, 36R. Each of the light-weight frame housings 20F, 20R, foam middle housings (28F', 28'R) and front and rear bottom foam housings 36F, 36R are constructed similarly as the related parts of other robot embodiments described herein, for example, are foam based. As such, robot 17 is inter alia, easy to work with and to change the design where necessary for different applications, super affordable, strong and mechanical-energy (shock) absorbing, which protects the components in the robot.

The conduit hinge area 21A separates the front and rear middle foam housings (layers) 28F', 28R' and therefore the front and rear frame housings 20F, 20R. The conduits 21B are made of rigid or semi-rigid material, such as acrylonitrile butadiene styrene (ABS), carbon fiber, flexible material such as rubber, thermoplastic polyurethane (TPU), foam etc. And as mentioned above, the conduits 21B allows for a pass through and protection of the wires for electronic connection to the components of the both foam (light-weight) frame housings 20F, 20R, regardless of whether the electronics modules and other operational components, or some subset thereof, such as a camera assembly 60, are in the front or rear housings or housing sections 20F, 20R.

Preferably, lateral bumpers 20A are arranged on outer sides of the conduit hinge area 21A, at opposing ends of each of the front and rear top housings 24F, 24R, and the front and rear bottom foam housings 36F, 36R. These lateral bumpers 20A limit the movement of the foam frame sections 20F, 20R, side to side, about the hinge area 21A. Limiting the movement aides in control and stability, but also allows lateral flexibility and shock absorption when taking shocks from falls and maneuvering over rough terrain.

Figure 25:
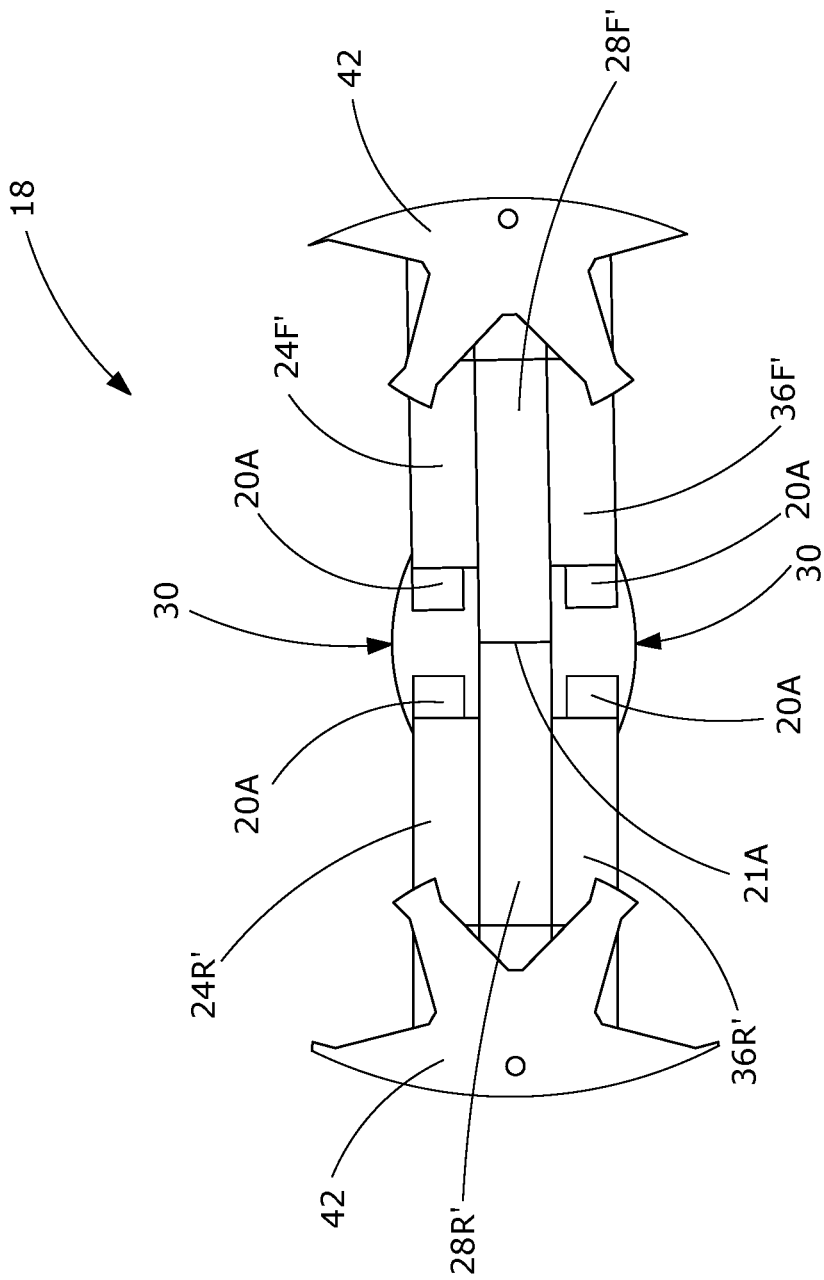
FIG. 25 depicts a magnified side view of the middle section of the robot first depicted in FIG. 23.

Also included in robot 17 are deflection angle limiting straps 30. The deflection angle limiting straps 30 are located above the conduit hinge assembly 21 and hinge area 21A, preferably embedded in respective parts of the front and rear top housings 24F, 24R, and the front and rear bottom foam housings 36F, 36R, as shown in FIGS. 17 and 25. The deflection angle limiting straps 30 limit the upward and downward angular deflection of the 2 respective foam frame sections 20F, 20R, in relation to each other, to optimize the robot's ability to climb obstacles and remain stable and to prevent the foam frame sections 20F, 20R from folding over on each other. Moreover, the conduit hinge assembly 21, the conduit hinge area 21A, the conduits 21B (which also provide a stabilizing connection as well as a path for wires, etc.), the conduit anchors 21C (preferably made from TPU), the lateral bumpers 20A and deflection angle limiting straps 30 together allow for better control of the robot 17 while climbing up and down stairs, and isolates each of the foam frame housings or sections from any shocks received by the other foam frame housings or sections when the robot tumbles down the stairs. As such, the robot 17 can operate down-side up and up-side down.

Figure 19:
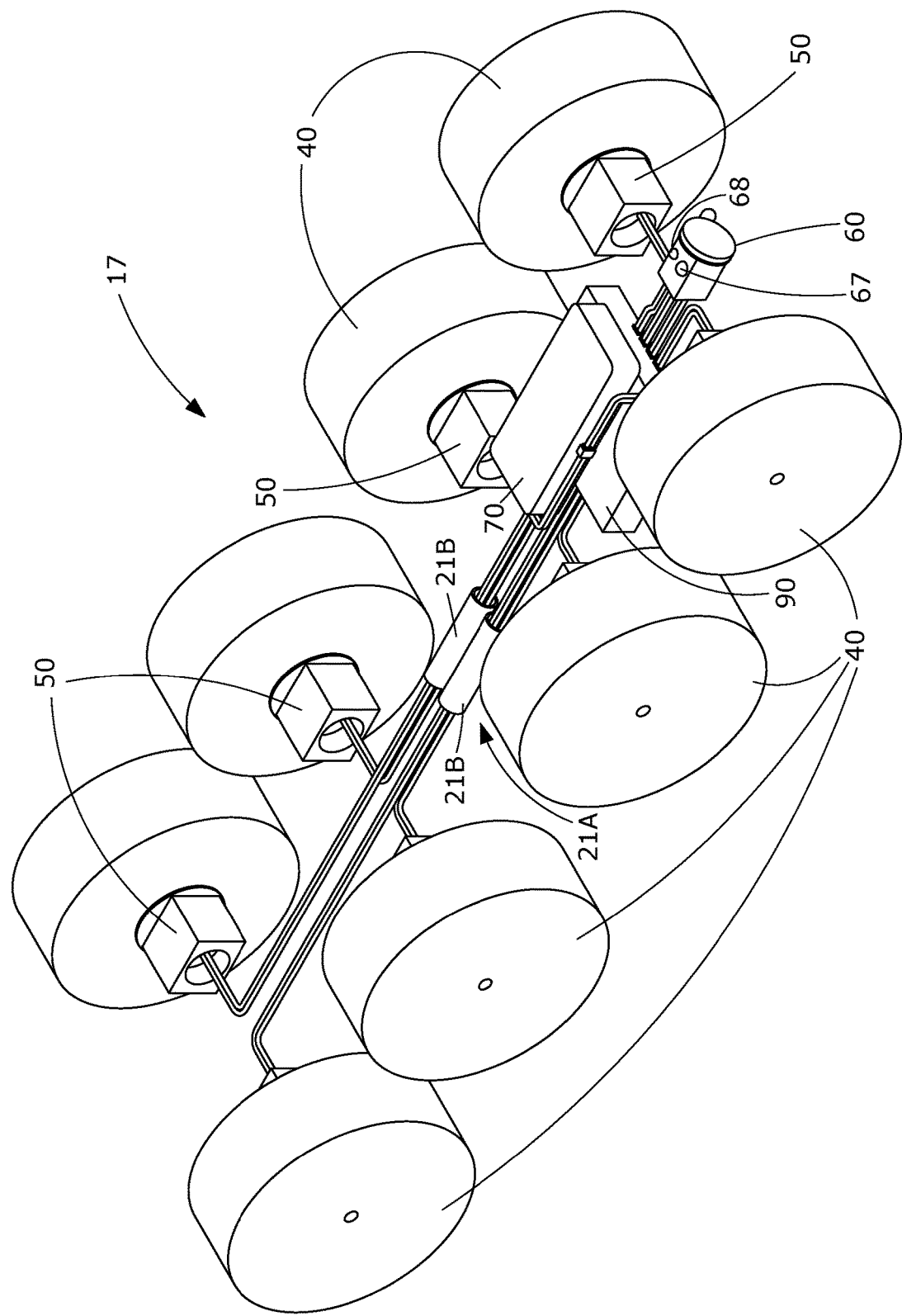
FIG. 19 depicts a perspective view of the robot FIG. 16, with the frame housing removed.
Figure 20:
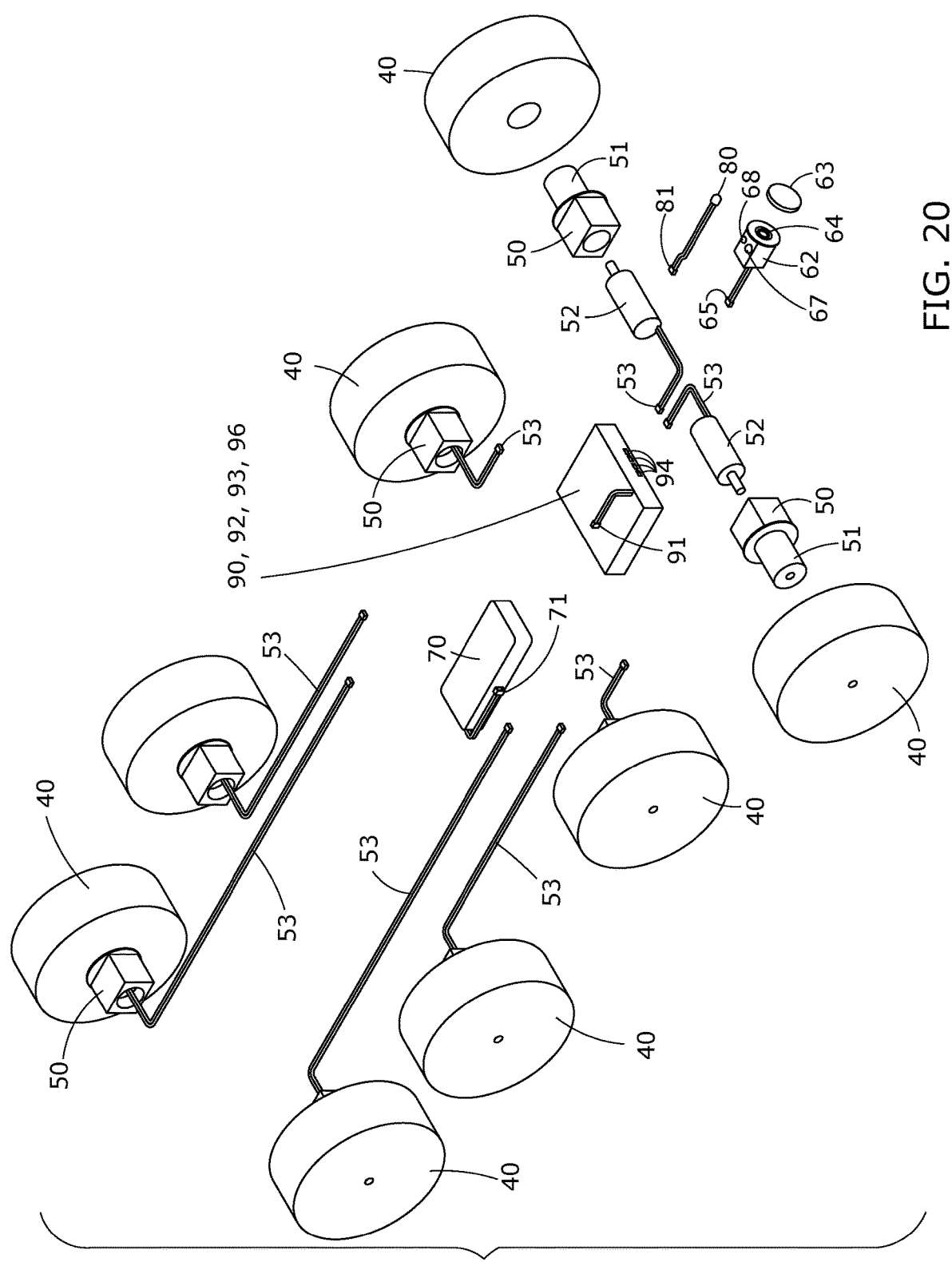
FIG. 20 presents an exploded or expanded view of the operational components of the robot first depicted in FIG. 16.
Figure 21:
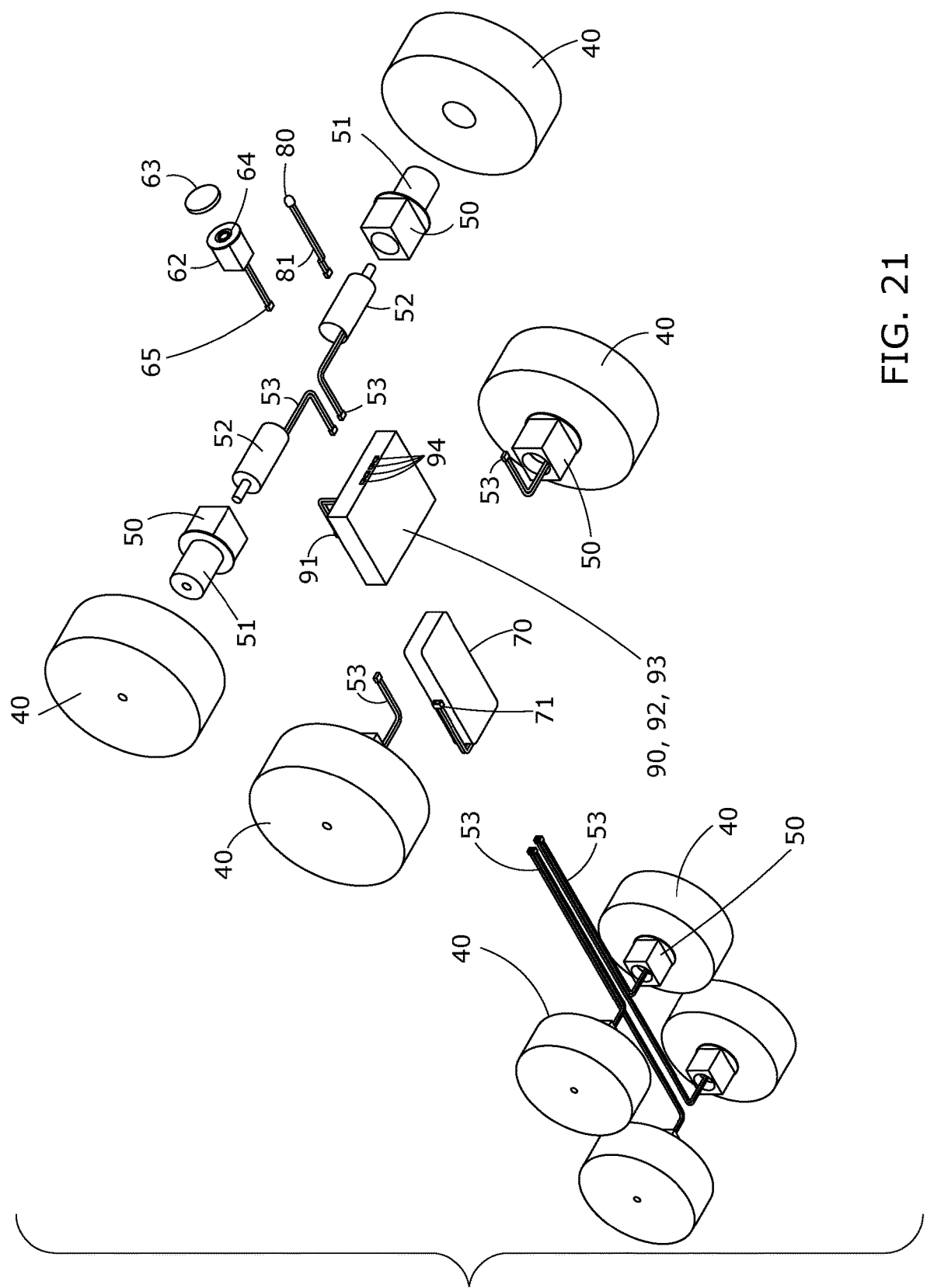
FIG. 21 presents a bottom perspective view of the operational components of the robot first depicted in FIG. 16.

FIG. 19 depicts a perspective view of the robot 17 (FIG. 16), with the frame housing removed. The conduits 21B are shown therein, within conduit hinge area 21A, surrounding connection element or wires 53. FIG. 20 presents an exploded or expanded view of the operational components of the robot 17. FIG. 21 presents a bottom perspective view of the operational components of the robot 17.

Figure 22:
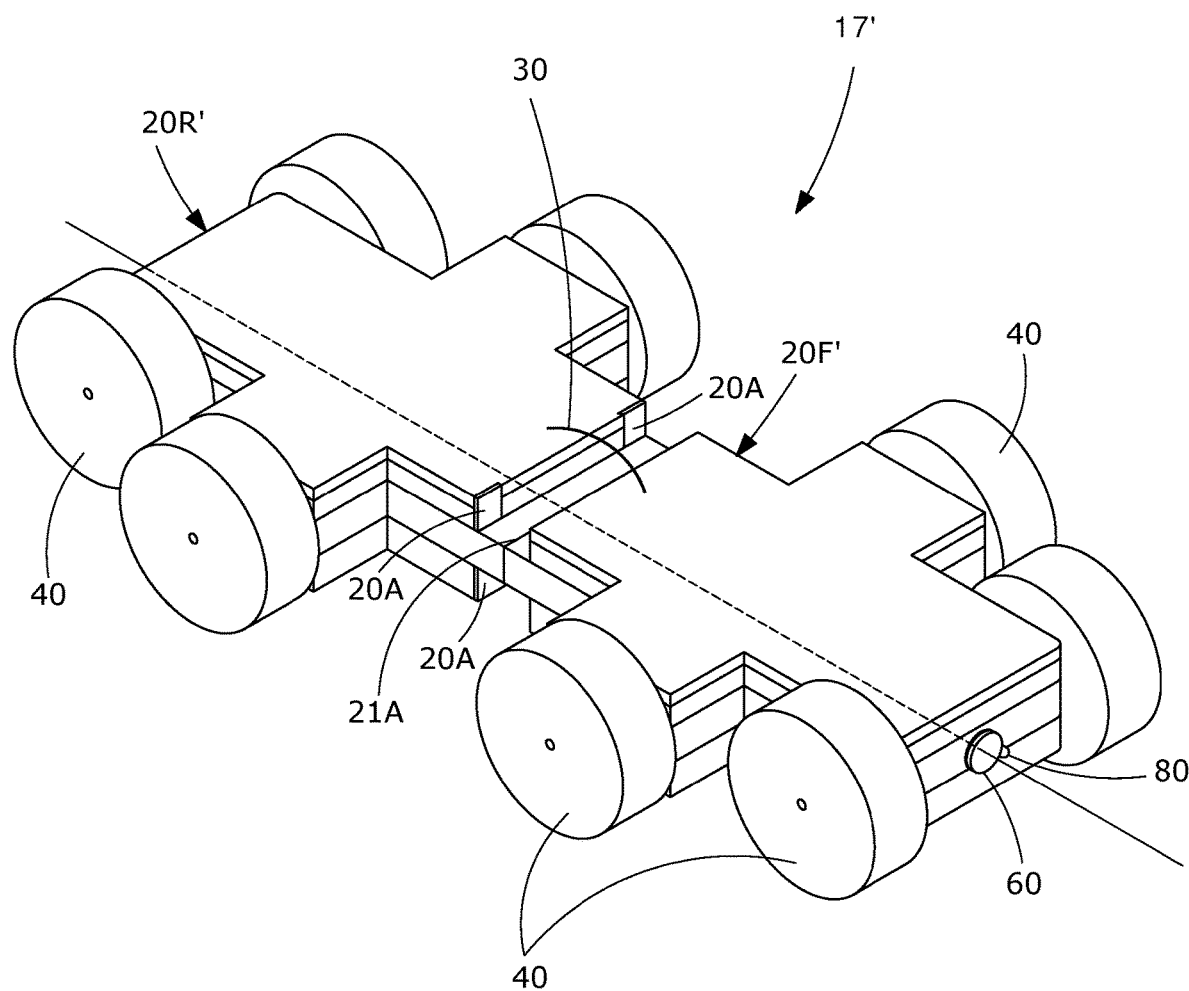
FIG. 22 presents an alternative embodiment to the robot first depicted in FIG. 16, where a portion of front and rear foam frame sections, and wheels positioned thereon, extend out horizontally, substantially perpendicular to the central axis of the robot.

FIG. 22 presents a robot 17' that is an alternative embodiment to the robot 17. The front and rear light-weight frame housings or housing sections 20F' and 20R' of robot 17', are formed such that a portion of the housings in which the motor compartments 50 for the inner pairs of wheels 40 are disposed, extend out horizontally, substantially perpendicular to the central axis of the robot, as shown. Such a wheel arrangement enables better traction and climbing ability for given obstacle configurations. But while the horizontally extended portions are shown to be located so that the inner pairs of wheels 40 extend out further than the outer pairs of wheels 40, the invention is not limited thereto. The extended portions may be located so that the outer wheel pairs extend out horizontally, rather than the inner wheel pairs as shown, or any other combination thereof, to suit a particular climbing operation.

Figure 23:
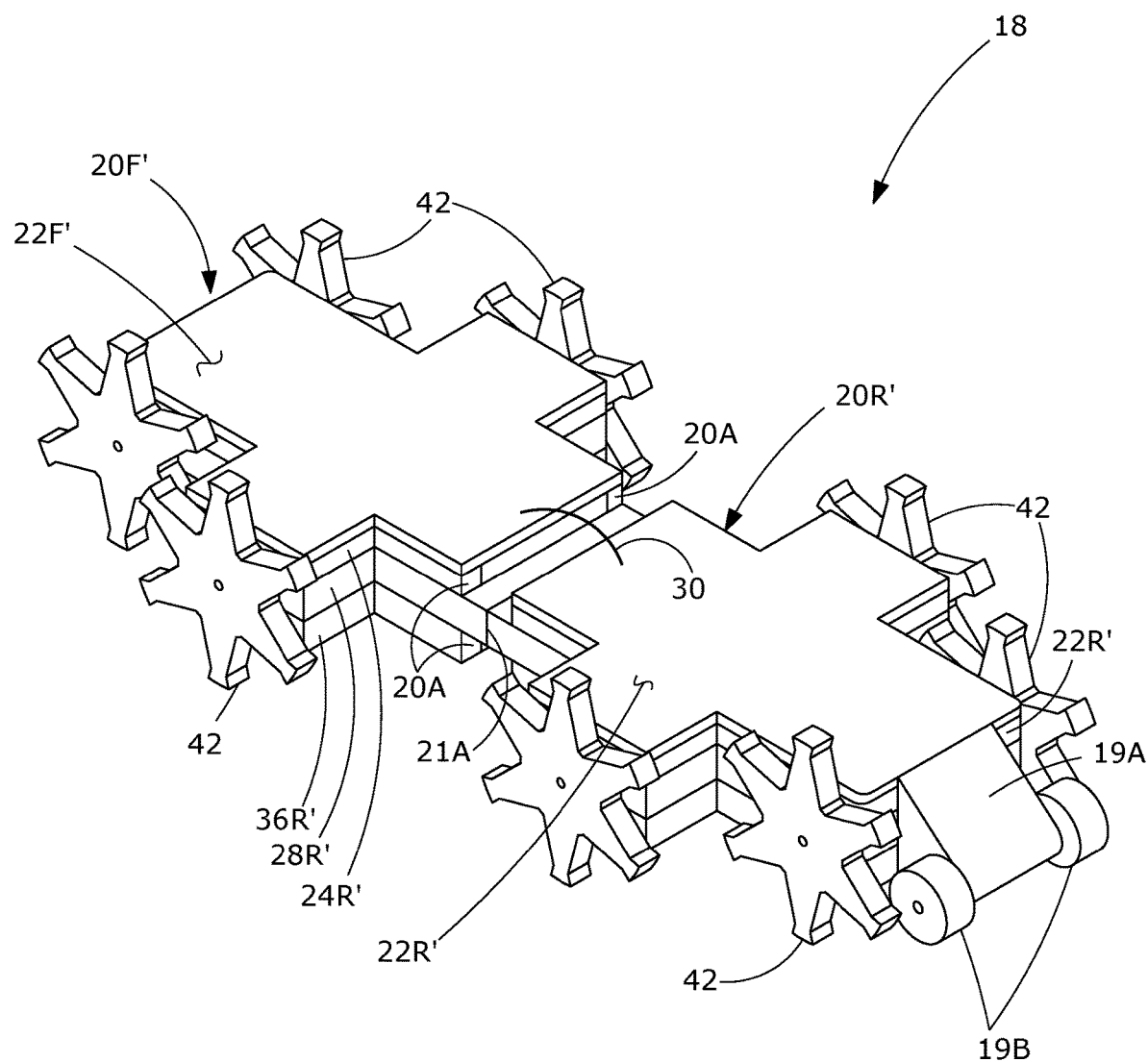
FIG. 23 presents an alternative embodiment of the robot of FIG. 22, where the wheels are replaced with obstacle climbing gears (or star wheels) for enhanced climbing and stability.

FIG. 23 presents a robot 18, that is an alternative embodiment of the robot of FIG. 22. In robot 18, the wheels 40 are replaced with obstacle climbing gears or star wheels 42 for enhanced climbing and stability. The rear of the robot 18 includes an anti-flip element or extension 19A and a anti flip wheel 19B, or pair of anti-flip wheels 19B. The anti-flip-element 19A is located in the rear of the robot and prevents it from flipping backwards, for example, when climbing.

And while the anti-flip element or extension 19A is shown with a pair of anti-flip wheels 19B, the wheels 19B can be replaced with rectangular shaped rods made of thermoplastic polyurethane (TPU). For that matter, the anti-flip element 19A also could include a handle in place of the wheel(s), or in addition to the wheel(s).

Figure 24:
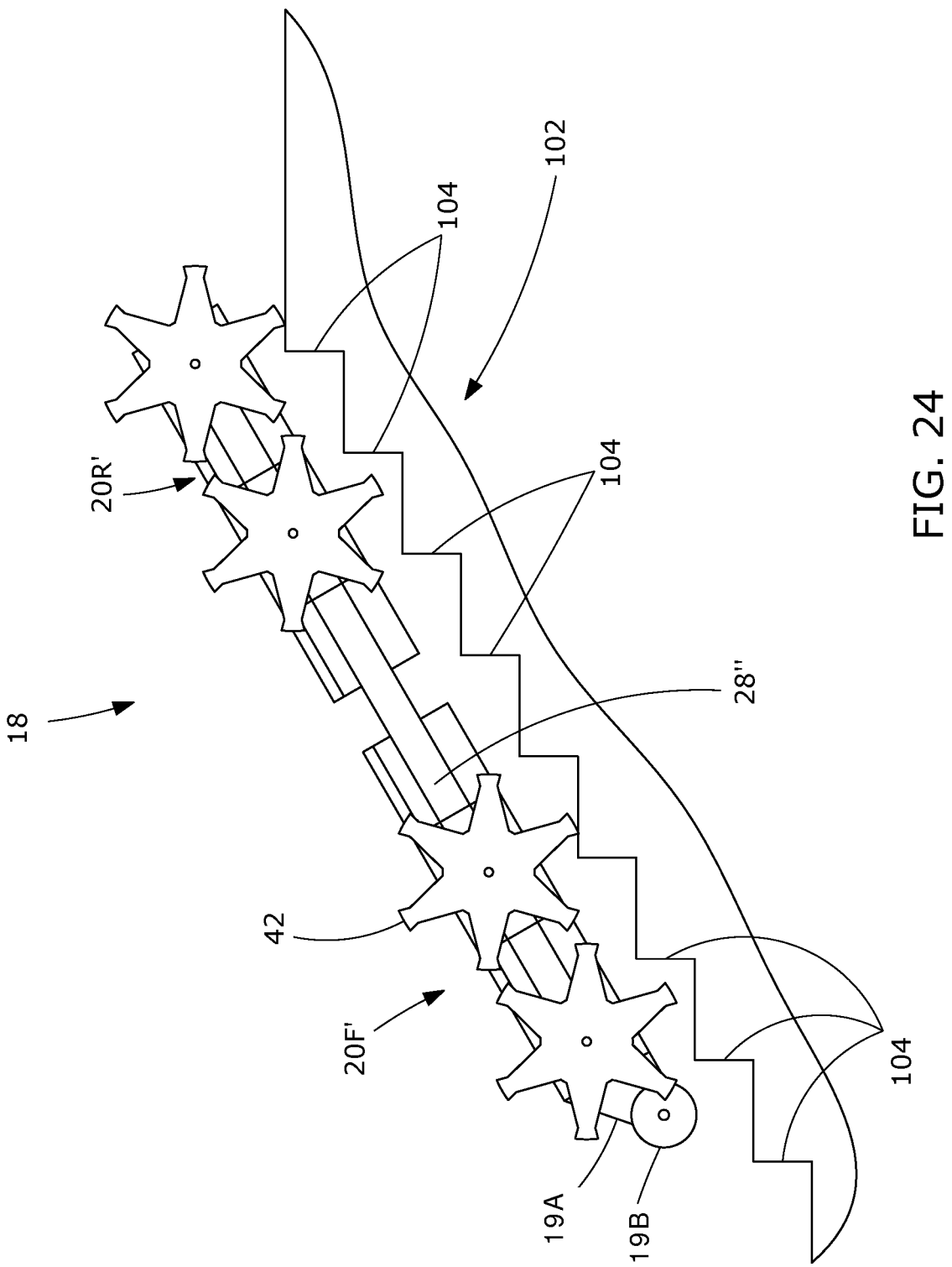
FIG. 24 depicts the robot of FIG. 23 climbing down the stairs of a staircase.

FIG. 24 depicts the robot 18 climbing up the stairs 104 of a staircase 102. FIG. 25 depicts a magnified side view of a mid-section of the robot 18 (star wheels 42 not drawn to scale), to highlight the conduit hinge assembly 21, located proximate conduit hinge area 21A between the front and rear middle housings or housing sections 28F', 28R'. Bumpers 20A are shown at the inner ends of front and rear top housings 24F', 24R' and front and rear bottom housings 36F'. 36R', where the straps 30 connect those top and bottom sections (24F'', 24R'; 36F'', 36R'), as explained above (see FIGS. 16-19).

Figure 26:
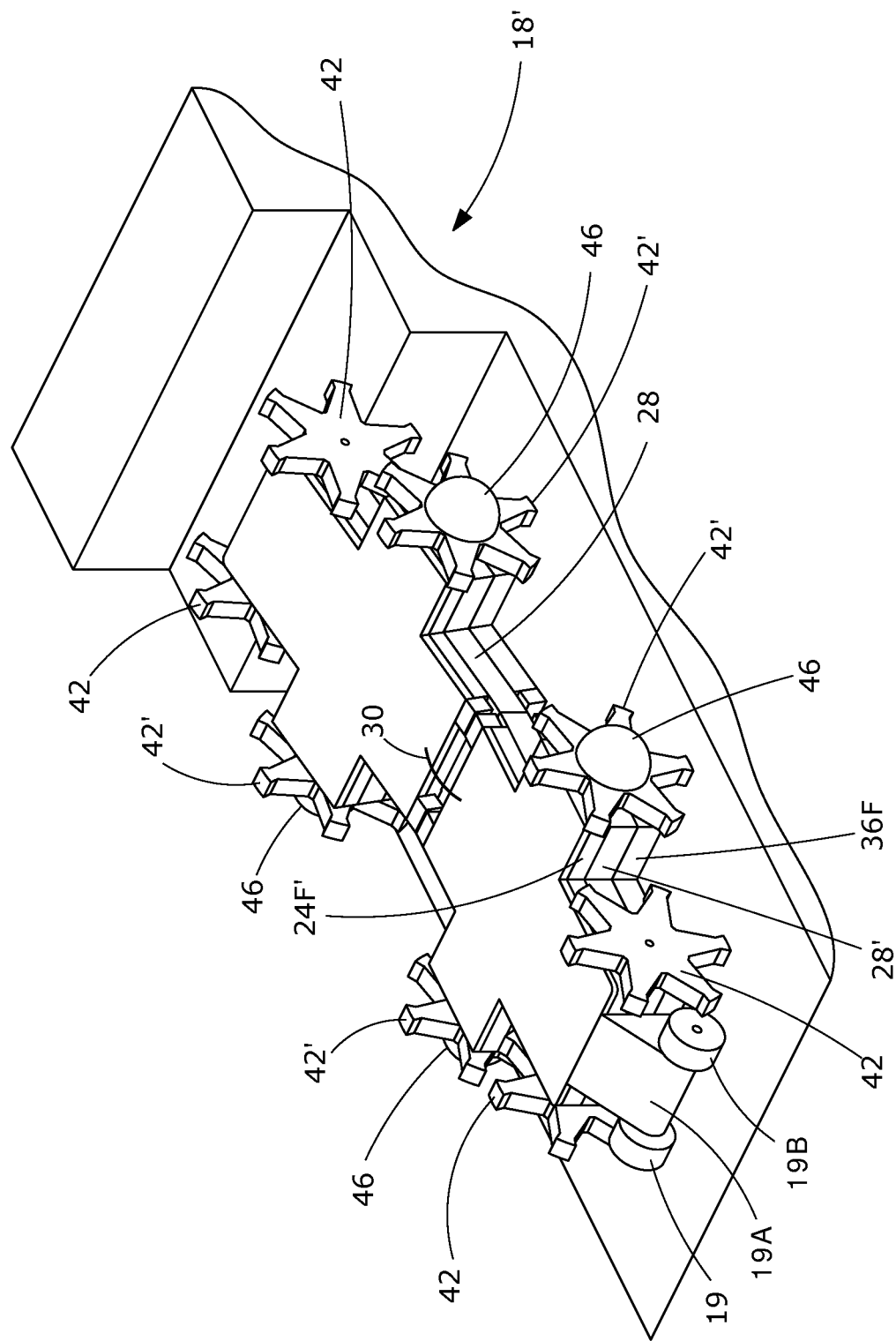
FIG. 26 presents an alternative embodiment of the robot first depicted in FIG. 23, climbing up stairs, in which several of the obstacle climbing or star wheels include a shock absorbing hub cap.
Figure 27:
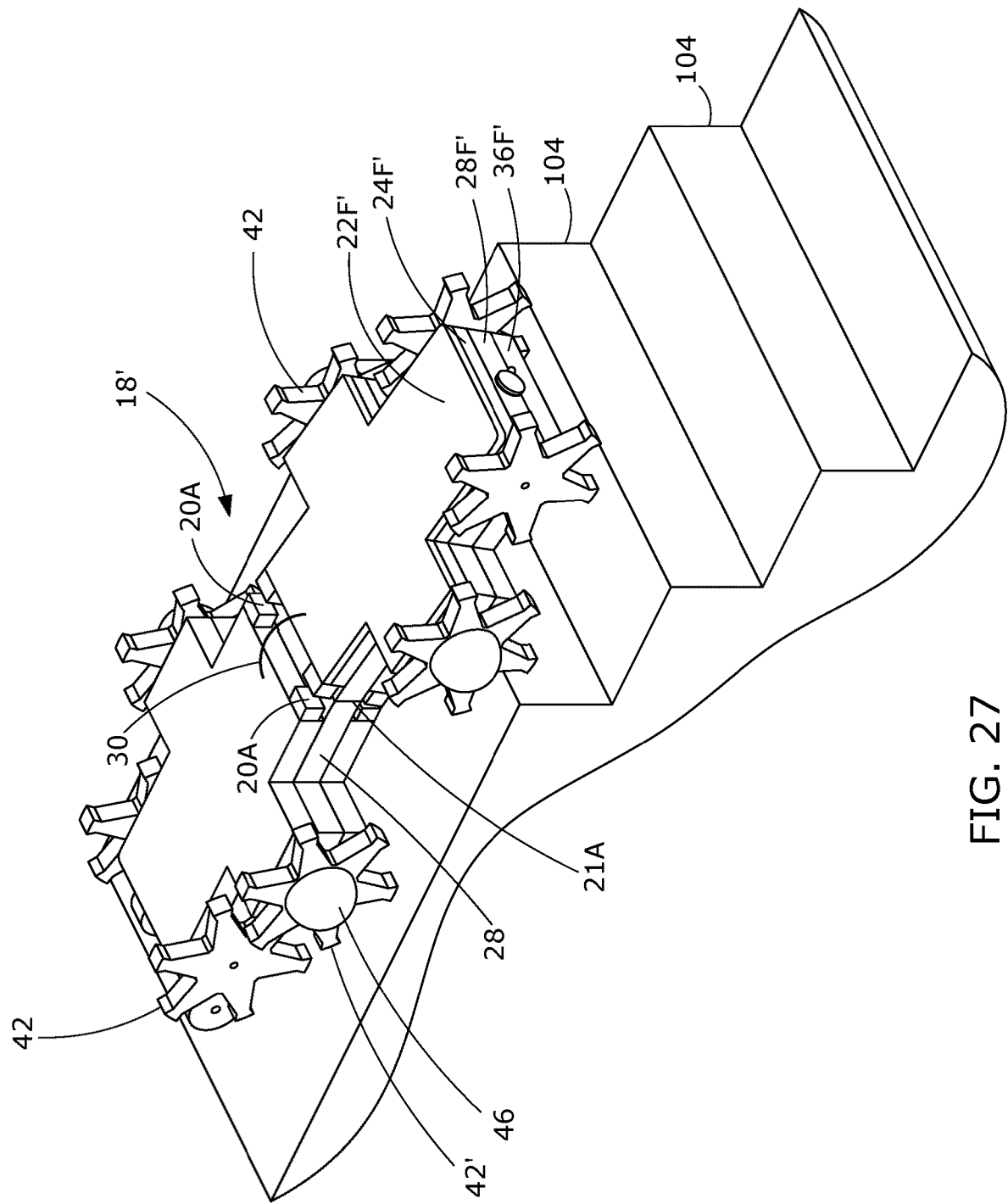
FIG. 27 presents the robot of FIG. 26 climbing down the stairs.

FIG. 26 depicts a robot 18' that is an alternative embodiment of the robot 18, in which several of the obstacle climbing or star wheels 42' (as distinguished from star wheel 42), include a shock absorbing hub cap 46. The shock absorbing hub caps 46 function to improve shock absorption of the robot 18' as a whole when the robot falls on its side, or is otherwise exposed to a mechanical shock at the hub cap. The shock absorbing hub caps 46 also prevent the robot from resting on its side as it would if the hubcaps were flat instead of round. FIG. 27 depicts robot 18' climbing down the stairs 104

As explained above, conduit hinge 21, in cooperation with deflection limiting straps 30 and the lateral bumpers 20A function as part of an articulating joint system that enables the inventive robots configured therewith to flex at a particular point in the robot's frame, while allowing the wires or connection elements 53 needed for power and control to pass from one side of the joint to the other, preferably protected (at the joint) within conduits 21B. This articulating joint system is used to join sections of the robot frame (the front and back housings 20F', 20R') and allow for up and down as well as side to side motion, enabling the robot to operate equally well right-side up or upside down. The articulating joint system can be made of rubber or TPU (for example) to allow for frictionless motion between robot frame housings or housing sections, all while isolating each robot frame housing of housing section from shock and vibration. The shock isolating aspect of the articulating joint system greatly increases the robot's ability to fall without getting damaged from mechanical shock resulting therefrom.

The articulating joint system allows the robot to climb and descend stairs with greater control. When climbing stairs, the first step is often the hardest step for the inventive robots to overcome. The articulating joint system enables the robot to flex to mount the first step more effectively. As the robot approaches stair steps, or a like obstacle, in an embodiment outfitted with a front set of star wheels (for example, a pair of 205 mm 3-legged star wheels or the 5-legged star wheels 42 depicted in FIG. 14), at least one of the star wheels engages the 1st step. The robot then moves forward, and the leas of the 3-legged star wheels contact the first step such that rotational force compelling a lea upon the stair upper surface operates to lift the front section up onto the first step, as the articulating joint system flexes and allows the rear section to remain level with the ground. This ability for the front section to pitch up independent of the rear section effectively lightens the load on the front motors and allows the rear section to stay level with the ground giving more traction to the rear set of star wheels.

As the robot continues to move forward, the second set of star wheels in this embodiment, embodying, for example, 164 mm 6-legged Star Wheels, begin to engage the first step as the rear section starts to deflect upward. As the rear section lifts upward it places more of a load on the second set of star wheels, providing the star wheels more traction as they engage the first step. The second set of star wheels propel the robot up the stairs, which then enables the front set of star wheels to engage the second step as the third set of star wheels (a pair of 192 mm 6-legged star wheels) engages the first step. As the first and third set of star wheel propel the robot up the stairs, the second set of star wheels engages the second step, as the fourth set of star wheels (a pair of 178 mm 6-legged star wheels) engages the first step. As all the star wheels now work together to propel the robot up the stairs, the anti-flip assembly 19A, mounted in the rear, prevents the robot from flipping over backward by contacting the steps (by anti-flip wheels 19B, for example) as the angle of attack increases as the robot climbs. The anti-flip element 19A is constructed of rubber or TPU in this embodiment to not break if the robot falls down the stairs.

When descending stairs, the top step going down is the most difficult to engage. As the robot moves forward over the top step, the front of the robot is suspended in mid-air. As the center of gravity of the robot gets closer to the edge of the top step the robot will pitch downward. This downward pitching motion builds both speed and momentum would cause a conventional robot w/o the inventive articulation joint system, to travel or fall down the stairs uncontrollably.

The articulating joint system enables the inventive robot's frame to flex downward, allowing the first set of star wheels to engage the second step sooner, thus preventing an uncontrolled rapid downward pitch, that could otherwise have an upsetting effect. The second set of star wheels (in this embodiment a pair of 164 mm 6-legged star wheels) can now engage the first step contributing to more control as the inventive robot slowly and controllably descends the stairs. The second set of star wheels are preferably the smallest of all the star wheels included in the robot (as shown) and thereby prevent the robot from pitching forward as it travels from the top step to the second step on the way down the stairs.

Figure 28:
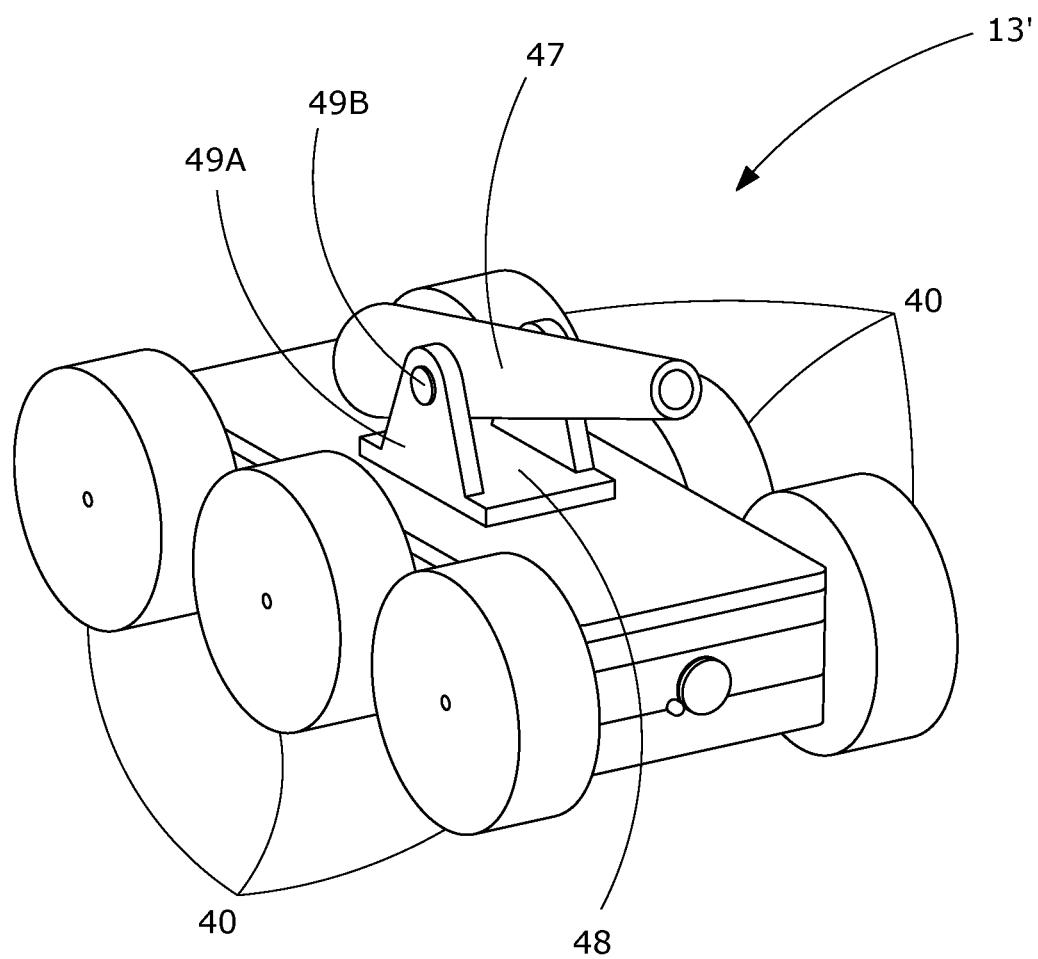
FIG. 28 presents an embodiment of a disposable robot of the invention that may be relied upon to support explosive ordinance disposal.

FIG. 28 depicts an embodiment of a disposable robot 13' that may be relied upon to support explosive ordinance disposal. Please note that in many aspects, the disposable robot 13' is like the robot 13 depicted in FIG. 11. That is, robot 13' is constructed with a light-weight foam housing, includes 6 wheels 40, motors 52, motor axles 51, wheel motor compartments 50, one or more sensor systems (such a camera assembly 60) and connection elements or wires 53, that are controlled by the OCU 200 via the electronics controller 92 (not shown in FIG. 28). In addition, robot 13' includes a disruptor 47 mounted on a mounting base 48, e.g., a plate of preferably light-weight material. The mounting base 48 is fixed to an outer upper surface of the robot housing, such as foam cover 22 or foam top housing (or housing layer) 24. Two opposing sides 49A extend up from the mounting base 48 and attachment means 49B (such as rivets) attaches the disruptor 47 to the sides 49A.

The disposable robot 13' and disruptor 47 may be utilized to deal with suspicious packages. That is, in response to a suspicious package, the robot 13' with disruptor 47 may be directed (using the OCU) down range to the suspicious package to disrupt or break apart the suspicious package. The disruptor 47 can be a small cannon loaded with water or a solid projectile, which are "shot" at or into the suspicious package in the hopes that any explosive device therein will break apart instead of exploding. If an explosive device does explode, the light-weight frame of the robot and disruptor will contribute minimal projectile mass, due to the light-weight foam construction. Put another way, the frames of conventional robots that might be equipped with a disruptor are much heavier than that of the inventive robot, and if fragmented in an explosion become part of the fragmentation debris that is the most dangerous part of any explosion. The inventive robot 13' solves this problem because it is made from soft, light-weight, energy absorbing foam which when blown up will not produce dangerous fragmentation debris (that is, the foam-formed parts) that might be violently projected in all directions when an explosive device is detonated by the proximate inventive foam-framed robot and disruptor.

In the FIG. 28 embodiment, the disruptor 47 is a non-lethal paintball-type gun that can be attached to robot 13'. In this embodiment, the robot 13' and disruptor 47 can be used by law enforcement to shoot small pellets, such as pepper balls and other non-lethal types of crowd dispersing munitions. An officer can park the inventive robot 13' out of sight under a small bush and engage a violent crowd of people without risk to the officer. The inventive robot 13' can also be equipped with a taser, in place of disruptor 47, and remotely subdue a suspect therewith. The inventive robot also can be used to investigate tunnels at the border enabling Border patrol agents to scout areas at a safe distance, climb on the rubble of a collapsed build and listen and look for survivors and controlled via a tether.

The invention also anticipates a method of manufacturing the robots, in the various embodiments, and modifications thereof.

That is, the invention provides a method for forming light-weight frame housing, or housings, that are constructed using foam sheets and the various robots constructed therewith. For example, light-weight frame housing 20 of robot 10 includes 3 foam sheets: foam top housing or layer 24, foam middle housing of layer 28 and foam bottom housing or layer 36, attached as 3-layer laminate. Of course, a fourth layer in the form of foam cover 22 is included in the robot 10 embodiment, when covered during intended use.

Preferably, the foam sheets comprise flame retardant, cross linked polyethylene foam. The foam sheets can be formed of differing thicknesses (e.g., ⅛', ¼", ⅓', ½", etc.), according to each robots' specifications. The various layers (i.e., foam sheets) of the foam frame can be cut by hand or using a machine such as a water jet or laser cutter. Each foam housing layer is cut to have compartments for the various components such as the motor housings, battery bay and electronics bay, as described in detail above. These layers formed of foam sheets are then affixed together (preferably by application of an adhesive layer or coating) to form a strong, laminated, light-weight energy absorbing frame capable of protecting anything mounted to or inside it, as well as maintaining the integrity of the robot when exposed to significant mechanical force when dropped, thrown or crashing down stairs or off and obstacle the robot is attempting to climb during intended operation.

Using this method of construction in reliance upon the laminated foam sheets with cut-outs, one skilled in the art of robot design can easily and quickly construct a custom robot prototype. Once formed, the robot prototype may be tested, and changes as needed to the design efficiently and quickly. The robot designer may then begin to produce a marketable robot for a fraction of the cost of a robot built with more traditional materials and methods.

Some of the many benefits of constructing a robot frame out of laminated or molded foam sheets (layers) include the ability to use 3D printed parts for load-bearing elements of the robot. Up to now, the use of 3D printed parts in a conventional robot design has been limited to elements which do not withstand much mechanical force to which they might be subjected during intended use, or if such a conventional robot is subjected to significant mechanical force, the conventional 3D printed part is designed to be easily replaced when they break. The inventive method of construction using light-weight energy absorbing foam sheets attached together allows for the inventive robots as described above that may be larger in size than a conventional robot within a similar weight range, but nevertheless able to inter alia overcome obstacles like stairs, that up to now only heavy, complex expensive, conventional robots could overcome, if at all. For example, the Avatar robot made by Robotex can climb stairs but weighs 26 pounds as compared to, for example, a FIG. 26 embodiment of the inventive robot 18 described herein, which weighs only 8 pounds, 12 ounces.

Due to the foam-based frame, the inventive robots can be readily formed from the foam sheets. That is, first, according to a particular robot application, the number and size of the foam sheets are determined, then the necessary cut-outs for seating the constituent parts are made therein; then, the parts are inserted and the foam sheets adhered as a laminate foam frame and then the wheel assemblies and other parts are added in one or more assembly steps, to realize a low cost, light-weight and easy to custom manufacture robot. As described above, the robot, depending on application, may be equipped with any known sensor (e.g., an imaging sensor for streaming video) and used for investigation of hostile and dangerous environments like nuclear power plants, storage tanks, ships hulls, mine fields, etc.

The reader and the skilled artisan should note that the OCU also preferably is formed with layers of foam sheet to better protect the constituent elements therein, as well as to realize the benefit of a light-weight OCU, for transportability. For that matter, both the robots and OCU formed as described herein, when sealed with a waterproof coating may be water immersed, and floated to a destination, where necessary.

LIST OF ELEMENTS

10 robot with 4 wheels
10' robot with 4 wheels and 2 cameras
12 robot with 10 wheels
13 robot with 6 wheels and grasping mechanism
13' robot with 6 wheels and a disrupter mechanism
14 robot with 8 wheels and front axle set at acute angle
15 robot with track
16 stair climbing robot
17 robot with two articulating sections, with 4 wheels per articulating section
17' robot with extended-out motor compartments
18 robot with star wheels
18' robot with star wheels and shock absorbing hubcap
19A anti-flip element or extension
19B anti-flip wheels
20 light-weight frame housing
20' light-weight frame housing for embodiment with conduit hinge
20F' front light-weight frame housing for embodiment with conduit hinge 20R' rear light-weight frame housing for embodiment with conduit hinge
20A lateral bumper
21 conduit hinge assembly
21A conduit hinge area
21B conduits
21C foam conduit anchors
22 foam cover
22F' front foam cover for embodiment with conduit hinge
22R' rear foam cover for embodiment with conduit hinge
23 Velcro layer
24 foam top housing
24F' front top housing for embodiment with conduit hinge
24R' rear top housing for embodiment with conduit hinge
28 foam middle housing
28' foam middle housing for embodiment with conduit hinge
28F' front foam middle housing for embodiment with conduit hinge
28R' front foam middle housing for embodiment with conduit hinge
29 motor compartment cutout
30 deflection angle limiting straps
36 foam bottom housing
36F' front bottom foam housing for embodiment with conduit hinge
36R' rear bottom foam housing for embodiment with conduit hinge
40 wheel
41 rim
42 obstacle climbing gears, or star wheels
42' obstacle climbing gears, or star wheels with shock absorbing hub caps
46 shock absorbing hub caps
47 disruptor
48 mounting base
49A opposing sides attached to mounting base
49B attachment means for mounting the disruptor to opposing side of the mounting base
50 wheel motor compartment
51 axle part of the motor compartment
52 motor
53 connection element or wires
54 set screw(s)
60 camera assembly
62 camera housing
63 camera cover
64 camera
65 camera connection element
66 additional camera assembly
67 speaker
68 microphone
70 battery module
71 connection element
80 light
81 light connection element
90 electronics module
91 first connection element
92 electronic controller
93 second connection element
94 connectors
96 antenna element
102 staircase
104 stairs
110 grasping mechanism
112 base element
113 rotational element
114 lifting elements
116 robotic arm
118 link
120 link connector
122 claw control
124 claw
130 Track assembly
132 roller
133 roller
134 roller
140 wheel pair section
150 extended housing frame
154 extended housing frame cover
200 operational control unit (OCU)
212 radio control unit
214 radio receiver
216 antenna
218 display device
220 microphone
222 speaker
224 voltmeter
225 switch
226 switch
228 robot control input device
230 robot arm control input device
232 battery
225 camera selection switch
242 bottom foam layer
244 middle foam layer
246A battery cutout
246B cutouts for switches 225, 226
246C voltmeter cutout
246D radio control unit cutout
246E cutouts for robot control input devices
246F display device cutout
246G cutout for radio receiver
246H cutout for antenna
248 top foam layer
248B cutouts for switches 225, 226
248C voltmeter cutout
248D radio control unit cutout
248E cutouts for robot control input devices
248F display device cutout
254 flaps As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A surveillance robot, comprising:
a light-weight body comprising front and rear body sections connected to each other by a conduit hinge assembly to facilitate articulation between the body sections and robot stability during use;
wheels;
wheel motors;
an electronic controller with a memory for controlling the wheel motors and the wheels; and
a sensor system including a camera, the sensor system wired to or wirelessly connected to the electronic controller for receiving any of environmental data, audio data and image data;
wherein the camera is positioned in the front body section in a front facing direction; and wherein the front and rear body sections are made of laminated layers of light-weight foam to substantially surround, structurally support and protect the wheel motors and electronic controller from mechanical shock.

2. The surveillance robot of claim 1, further comprising an operator control unit (OCU) and a transceiver wirelessly connected to the electronic controller in the robot, whereby the OCU sends control signals to and receives data from the electronic controller in the robot.

3. The surveillance robot of claim 1, wherein one or more of the laminated layers are coated with a thermo-plastic polyurethane layer (TPU).

4. A surveillance system comprising a robot and an operator control unit (OCU) for controlling the robot, wherein the robot comprises:
   a light-weight body comprising front and rear body sections connected to each other by a conduit hinge assembly to facilitate articulation between the front and rear body sections and robot stability during use;
   wheels;
   motor compartments positioned within the front and rear body sections;
   wheel motors positioned within the motor compartments and attached to the wheels;
   at least one sensor or sensor system including a camera, the at least one sensor system for detecting any of environmental data, audio data and image data, the camera positioned in the front body section in a front facing direction; and
   an electronic controller that is electrically or wirelessly connected to the wheel motors, the at least one sensor or sensor system and the OCU;
   wherein the front and rear body sections are formed made of laminated layers of light-weight foam to substantially surround, structurally support and protect the motor compartments, the electronic controller and/or wheel motors arranged therein, and the at least one sensor or sensor system from mechanical shock during use of the surveillance system.

5. The surveillance system according to claim 4, wherein the operator control unit (OCU) includes OCU components comprising:
   an OCU frame;
   a radio control unit comprising a radio control;
   a radio receiver;
   an antenna;
   a display device; and
   a robot control input device;
   wherein the OCU frame is made of light-weight foam that surrounds, structurally supports and protects OCU components from mechanical shock during use.

6. The surveillance system according to claim 4, wherein the at least one wheel includes or is replaced with an obstacle climbing gear that enhances an obstacle climbing ability of the robot.

7. The surveillance system according to claim 4, wherein each of the front and rear body sections have a top side and a bottom side and wherein the robot can operate when the top side is facing upwards or downward, depending on how the robot lands when thrown, or how the robot lands in response to a fall.

8. The surveillance system according to claim 7, further comprising an auxiliary camera positioned in the rear body section, in a rear facing direction, whereby the robot may thereby capture forward-looking image data whether forward facing or rear facing.

9. The surveillance system according to claim 4, wherein the at least one sensor system includes any of a microphone, a radiation sensor and a chemical detection sensor or system.

10. The surveillance system according to claim 4, wherein the OCU further comprises a battery-life indicator to provide an amount of battery time left in a battery that powers the robot.

11. The surveillance system according to claim 4, wherein the wheels of the robot comprise star gears to improve traction for climbing objects.

12. The surveillance system according to claim 4, wherein the robot further comprises a rear frame extension that functions as an anti-flip element for stability during robot climbing.

13. A surveillance system comprising a robot and an operator control unit (OCU) for controlling the robot, wherein the robot comprises:
   a light-weight body comprising first and second body sections formed from layers of light-weight foam;
   wheels attached to each of the at least first and second body sections;
   a components compartment and two or more motor compartments formed in the layers of light-weight foam at various positions within each of the first and second body sections;
   wheel motors positioned within the motor compartments and attached to the wheels;
   at least one sensor or sensor system including a camera, the at least one sensor system for detecting any of environmental data, audio data and image data, the camera arranged in a front-facing direction in a front one of the first and second body sections; and
   an electronic controller that is electrically or wirelessly connected to the wheel motors, the at least one sensor or sensor system and the OCU, the electronic controller positioned in the components compartment;
   wherein the layers of light-weight foam substantially surround, structurally support and protect the wheel motors, at least one sensor or sensor system and electronic controller from mechanical shock; and
   wherein a conduit hinge assembly interconnects or couples the first and the second body sections to facilitate articulation between the body.

14. The surveillance system according to claim 13, wherein the conduit hinge assembly comprises a conduit hinge and at least one conduit.

15. The surveillance system according to claim 13, wherein the conduit hinge assembly further comprises lateral bumpers, positioned in a conduit hinge area to absorb shock by physical contact between the body sections.

16. The surveillance system according to claim 13, wherein conduit hinge assembly further comprises a deflection angle limiting strap positioned to interconnect or couple each of the first and the second body sections in a way that prevents the body sections from folding over on each other.

17. The surveillance system according to claim 16, wherein the deflection angle limiting strap is positioned proximate the conduit hinge.

* * * * *